US009571550B2

(12) United States Patent
Mehrotra et al.

(10) Patent No.: US 9,571,550 B2
(45) Date of Patent: Feb. 14, 2017

(54) OPTIMIZED CLIENT SIDE RATE CONTROL AND INDEXED FILE LAYOUT FOR STREAMING MEDIA

(71) Applicant: Microsoft Corporation, Redmond, WA (US)

(72) Inventors: Sanjeev Mehrotra, Kirkland, WA (US); Kishore Kotteri, Bothell, WA (US); Bharath Siravara, Issaquah, WA (US); Thomas W. Holcomb, Bothell, WA (US); Hui Gao, Redmond, WA (US); Serge Smirnov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 701 days.

(21) Appl. No.: 13/735,945

(22) Filed: Jan. 7, 2013

(65) Prior Publication Data

US 2013/0124697 A1 May 16, 2013

Related U.S. Application Data

(62) Division of application No. 12/119,364, filed on May 12, 2008, now Pat. No. 8,379,851.

(51) Int. Cl.
*H04N 7/167* (2011.01)
*A63F 9/24* (2006.01)
(Continued)

(52) U.S. Cl.
CPC ........... *H04L 65/607* (2013.01); *H04L 65/608* (2013.01); *H04N 21/00* (2013.01)

(58) Field of Classification Search
CPC .... H04B 7/0862; H03F 1/3247; H03F 1/3252; H04L 2001/0098; H04L 65/607; H04N 21/00
(Continued)

(56) References Cited

U.S. PATENT DOCUMENTS 4,051,470 A 9/1977 Esteban et al.
4,454,546 A 6/1984 Mori
(Continued)

FOREIGN PATENT DOCUMENTS

EP 1931148 6/2008
JP 2008-523687 7/2008
WO WO 2007/058515 5/2007

OTHER PUBLICATIONS

Agarwal et al., "Optimal Buffering Policy for Downloading Music in Heterogeneous Wireless Networks," Wireless Communications and Networking Conference, vol. 1, pp. 337-341, Mar. 17-21, 2002.
(Continued)

*Primary Examiner* — Arvin Eskandarnia
*Assistant Examiner* — Margishi Desai
(74) *Attorney, Agent, or Firm* — Sunah Lee; Dan Choi; Micky Minhas

(57) ABSTRACT

An indexed file layout, comprising index information, is defined for segmented streaming of multimedia content. The index information can comprise program description information and streaming segment index information. In addition, the layout can comprise files containing streaming segments of the program, where the streaming segments are each encoded at one or more bitrates independently of other streaming segments of the program. The layout supports client switching between different bitrates at segment boundaries. Optimized client-side rate control of streaming content can be provided by defining a plurality of states, selecting available paths based on constraint conditions, and selecting a best path through the states (e.g., based on a distortion measure). In one client-side rate control solution states correspond to a specific bitrate of a specific streaming segment, and in another client-side rate control solution states correspond to a measure of client buffer fullness.

14 Claims, 7 Drawing Sheets

(51) Int. Cl.
  *G06F 17/00* (2006.01)
  *H04L 29/06* (2006.01)
  *H04N 21/00* (2011.01)

(58) Field of Classification Search
  USPC .......................... 375/240; 709/231; 380/200
  See application file for complete search history.

(56) References Cited

U.S. PATENT DOCUMENTS

| | | | |
|---|---|---|---|
| 4,493,091 A | 1/1985 | Gundry | |
| 4,706,260 A | 11/1987 | Fedele et al. | |
| 4,748,626 A * | 5/1988 | Wong | H03M 13/00 375/262 |
| 4,802,224 A | 1/1989 | Shiraki et al. | |
| 4,954,892 A | 9/1990 | Asai et al. | |
| 5,043,919 A | 8/1991 | Callaway et al. | |
| 5,089,889 A | 2/1992 | Sugiyama | |
| 5,136,377 A | 8/1992 | Johnston et al. | |
| 5,216,519 A * | 6/1993 | Daggett | H04N 1/001 358/402 |
| 5,235,618 A | 8/1993 | Sakai et al. | |
| 5,262,964 A | 11/1993 | Bonsall et al. | |
| 5,266,941 A | 11/1993 | Akeley et al. | |
| 5,317,672 A | 5/1994 | Crossman et al. | |
| 5,394,170 A | 2/1995 | Akeley et al. | |
| 5,398,069 A | 3/1995 | Huang et al. | |
| 5,400,371 A | 3/1995 | Natarajan | |
| 5,414,796 A | 5/1995 | Jacobs et al. | |
| 5,448,297 A | 9/1995 | Alattar et al. | |
| 5,454,014 A * | 9/1995 | Blaker | G06F 17/10 375/341 |
| 5,457,495 A | 10/1995 | Hartung | |
| 5,467,134 A | 11/1995 | Laney et al. | |
| 5,471,500 A * | 11/1995 | Blaker | H03M 13/3961 375/340 |
| 5,533,052 A | 7/1996 | Bhaskar | |
| 5,570,363 A | 10/1996 | Holm | |
| 5,579,430 A | 11/1996 | Grill et al. | |
| 5,586,200 A | 12/1996 | Devaney et al. | |
| 5,602,959 A | 2/1997 | Bergstrom et al. | |
| 5,623,424 A | 4/1997 | Azadegan et al. | |
| 5,627,938 A | 5/1997 | Johnston | |
| 5,650,860 A | 7/1997 | Uz | |
| 5,654,760 A | 8/1997 | Ohtsuki | |
| 5,661,755 A | 8/1997 | Van De Kerkhof et al. | |
| 5,666,161 A | 9/1997 | Kohiyama et al. | |
| 5,666,464 A * | 9/1997 | Serizawa | 704/207 |
| 5,686,964 A | 11/1997 | Tabatabai et al. | |
| 5,689,499 A * | 11/1997 | Hullett et al. | 370/235 |
| 5,724,453 A | 3/1998 | Ratnakar et al. | |
| 5,742,735 A | 4/1998 | Eberlein et al. | |
| 5,754,974 A | 5/1998 | Griffin et al. | |
| 5,787,203 A | 7/1998 | Lee et al. | |
| 5,802,213 A | 9/1998 | Gardos | |
| 5,819,215 A | 10/1998 | Dobson et al. | |
| 5,825,310 A | 10/1998 | Tsutsui | |
| 5,835,149 A | 11/1998 | Astle | |
| 5,835,495 A | 11/1998 | Ferriere | |
| 5,845,243 A | 12/1998 | Smart et al. | |
| 5,867,230 A | 2/1999 | Wang et al. | |
| 5,878,060 A * | 3/1999 | Wakamatsu | 714/795 |
| 5,884,039 A | 3/1999 | Ludwig et al. | |
| 5,886,276 A | 3/1999 | Levine et al. | |
| 5,903,892 A | 5/1999 | Hoffert et al. | |
| 5,917,830 A | 6/1999 | Chen et al. | |
| 5,926,226 A | 7/1999 | Proctor et al. | |
| 5,933,451 A | 8/1999 | Ozkan et al. | |
| 5,952,943 A | 9/1999 | Walsh et al. | |
| 5,982,305 A | 11/1999 | Taylor | |
| 5,986,712 A | 11/1999 | Peterson et al. | |
| 5,987,376 A | 11/1999 | Olson et al. | |
| 5,990,945 A | 11/1999 | Sinha et al. | |
| 5,995,151 A | 11/1999 | Naveen et al. | |
| 6,000,053 A | 12/1999 | Levine et al. | |
| 6,002,439 A | 12/1999 | Murakami et al. | |
| 6,006,241 A | 12/1999 | Purnaveja et al. | |
| 6,014,706 A | 1/2000 | Cannon et al. | |
| 6,029,126 A | 2/2000 | Malvar | |
| 6,041,345 A | 3/2000 | Levi et al. | |
| 6,049,630 A | 4/2000 | Wang et al. | |
| 6,058,362 A | 5/2000 | Malvar | |
| 6,072,831 A | 6/2000 | Chen | |
| 6,073,153 A | 6/2000 | Malvar | |
| 6,075,768 A | 6/2000 | Mishra | |
| 6,081,554 A | 6/2000 | Lee et al. | |
| 6,088,333 A * | 7/2000 | Yang et al. | 370/238 |
| 6,088,392 A | 7/2000 | Rosenberg | |
| 6,108,382 A | 8/2000 | Gringeri et al. | |
| 6,111,914 A | 8/2000 | Bist | |
| 6,115,689 A | 9/2000 | Malvar | |
| 6,141,053 A | 10/2000 | Saukkonen | |
| 6,160,846 A | 12/2000 | Chiang et al. | |
| 6,167,162 A | 12/2000 | Jacquin et al. | |
| 6,182,034 B1 | 1/2001 | Malvar | |
| 6,192,075 B1 | 2/2001 | Jeng | |
| 6,212,232 B1 | 4/2001 | Reed et al. | |
| 6,215,820 B1 | 4/2001 | Bagni et al. | |
| 6,223,162 B1 | 4/2001 | Chen et al. | |
| 6,226,407 B1 | 5/2001 | Zabih et al. | |
| 6,240,380 B1 | 5/2001 | Malvar | |
| 6,243,497 B1 | 6/2001 | Chiang et al. | |
| 6,259,739 B1 | 7/2001 | Kondo | |
| 6,266,701 B1 * | 7/2001 | Sridhar | H04L 29/12066 370/465 |
| 6,278,735 B1 | 8/2001 | Mohsenian | |
| 6,311,209 B1 | 10/2001 | Olson et al. | |
| 6,320,825 B1 | 11/2001 | Bruekers et al. | |
| 6,339,794 B2 | 1/2002 | Bolosky et al. | |
| 6,343,314 B1 * | 1/2002 | Ludwig et al. | 709/204 |
| 6,351,226 B1 | 2/2002 | Saunders et al. | |
| 6,370,502 B1 | 4/2002 | Wu et al. | |
| 6,381,267 B1 * | 4/2002 | Abdelilah et al. | 375/222 |
| 6,421,738 B1 | 7/2002 | Ratan et al. | |
| 6,421,739 B1 | 7/2002 | Holiday | |
| 6,433,795 B1 | 8/2002 | MacNaughton et al. | |
| 6,441,754 B1 | 8/2002 | Wang et al. | |
| 6,466,987 B2 | 10/2002 | Bolosky et al. | |
| 6,473,409 B1 | 10/2002 | Malvar | |
| 6,490,554 B2 | 12/2002 | Endo et al. | |
| 6,493,388 B1 | 12/2002 | Wang | |
| 6,501,797 B1 | 12/2002 | Van der Schaar et al. | |
| 6,501,798 B1 | 12/2002 | Sivan | |
| 6,522,693 B1 | 2/2003 | Lu et al. | |
| 6,539,124 B2 | 3/2003 | Sethuraman et al. | |
| 6,560,636 B2 | 5/2003 | Cohen et al. | |
| 6,573,915 B1 | 6/2003 | Sivan et al. | |
| 6,574,593 B1 | 6/2003 | Gao et al. | |
| 6,625,321 B1 | 9/2003 | Li et al. | |
| 6,628,712 B1 | 9/2003 | Le Maguet | |
| 6,646,195 B1 | 11/2003 | Puryear | |
| 6,654,417 B1 | 11/2003 | Hui | |
| 6,654,419 B1 | 11/2003 | Sriram et al. | |
| 6,654,790 B2 | 11/2003 | Ogle et al. | |
| 6,675,199 B1 | 1/2004 | Mohammed et al. | |
| 6,697,072 B2 | 2/2004 | Russell et al. | |
| 6,704,813 B2 | 3/2004 | Smirnov et al. | |
| 6,728,317 B1 | 4/2004 | Demos | |
| 6,732,071 B2 | 5/2004 | Lopez-Estrada et al. | |
| 6,745,364 B2 | 6/2004 | Bhatt et al. | |
| 6,754,715 B1 | 6/2004 | Cannon et al. | |
| 6,760,482 B1 | 7/2004 | Taubman | |
| 6,760,598 B1 | 7/2004 | Kurjenniemi | |
| 6,763,374 B1 | 7/2004 | Levi et al. | |
| 6,789,123 B2 | 9/2004 | Li et al. | |
| 6,792,449 B2 | 9/2004 | Colville et al. | |
| 6,801,947 B1 | 10/2004 | Li | |
| 6,810,083 B2 | 10/2004 | Chen et al. | |
| 6,836,791 B1 | 12/2004 | Levi et al. | |
| 6,876,703 B2 | 4/2005 | Ismaeil et al. | |
| 6,885,471 B1 | 4/2005 | Minowa et al. | |
| 6,895,050 B2 | 5/2005 | Lee | |
| 6,909,746 B2 * | 6/2005 | Trovato | 375/240.03 |
| 6,934,677 B2 | 8/2005 | Chen et al. | |

(56) References Cited

U.S. PATENT DOCUMENTS

| | | |
|---|---|---|
| 6,937,770 B1 | 8/2005 | Oguz et al. |
| 6,961,631 B1 | 11/2005 | Puryear |
| 6,968,364 B1 | 11/2005 | Wong et al. |
| 6,974,901 B2 | 12/2005 | Puryear |
| 6,980,695 B2 | 12/2005 | Mehrotra |
| 6,980,955 B2* | 12/2005 | Okutani et al. ............ 704/258 |
| 6,985,959 B1* | 1/2006 | Lee ............... 709/238 |
| 7,003,458 B2* | 2/2006 | Feng et al. ............ 704/236 |
| 7,016,409 B2 | 3/2006 | Unger |
| 7,023,915 B2 | 4/2006 | Pian |
| 7,027,982 B2 | 4/2006 | Chen et al. |
| 7,031,700 B1 | 4/2006 | Weaver et al. |
| 7,046,805 B2 | 5/2006 | Fitzhardinge et al. |
| 7,054,365 B2 | 5/2006 | Kim et al. |
| 7,054,774 B2 | 5/2006 | Batterberry et al. |
| 7,072,973 B1 | 7/2006 | Newson et al. |
| 7,107,606 B2 | 9/2006 | Lee |
| 7,111,044 B2 | 9/2006 | Lee |
| 7,124,164 B1 | 10/2006 | Chemtob |
| 7,143,030 B2 | 11/2006 | Chen et al. |
| 7,146,313 B2 | 12/2006 | Chen et al. |
| 7,149,247 B2 | 12/2006 | Sullivan |
| 7,151,749 B2 | 12/2006 | Vega-Garcia et al. |
| 7,162,533 B2 | 1/2007 | Klemets |
| 7,174,384 B2 | 2/2007 | Cheung |
| 7,174,385 B2 | 2/2007 | Li |
| 7,176,957 B2 | 2/2007 | Ivashin et al. |
| 7,177,642 B2 | 2/2007 | Sanchez Herrero et al. |
| 7,184,959 B2 | 2/2007 | Gibbon |
| 7,185,082 B1 | 2/2007 | Del Val et al. |
| 7,190,670 B2 | 3/2007 | Varsa et al. |
| 7,206,809 B2* | 4/2007 | Ludwig et al. ............ 709/204 |
| 7,206,822 B2 | 4/2007 | Levi et al. |
| 7,206,854 B2 | 4/2007 | Kauffman et al. |
| 7,248,740 B2 | 7/2007 | Sullivan |
| 7,257,628 B2* | 8/2007 | Liskov et al. ............ 709/223 |
| 7,260,525 B2 | 8/2007 | Chen et al. |
| 7,263,482 B2 | 8/2007 | Chen et al. |
| 7,266,613 B1 | 9/2007 | Brown et al. |
| 7,283,881 B2 | 10/2007 | Puryear |
| 7,283,966 B2 | 10/2007 | Zhang et al. |
| 7,286,748 B2 | 10/2007 | Srinivasan et al. |
| 7,289,435 B2* | 10/2007 | Yehuda et al. ............ 370/222 |
| 7,296,063 B2 | 11/2007 | Levi et al. |
| 7,302,490 B1 | 11/2007 | Gupta et al. |
| 7,313,236 B2 | 12/2007 | Amini et al. |
| 7,313,755 B2 | 12/2007 | Rahman et al. |
| 7,336,617 B1* | 2/2008 | Liu ............... 370/252 |
| 7,342,924 B2 | 3/2008 | Levi et al. |
| 7,343,291 B2 | 3/2008 | Thumpudi et al. |
| 7,346,007 B2 | 3/2008 | Curcio et al. |
| 7,348,483 B2 | 3/2008 | Puryear |
| 7,359,955 B2 | 4/2008 | Menon et al. |
| 7,360,230 B1 | 4/2008 | Paz et al. |
| 7,365,752 B2 | 4/2008 | Xie |
| 7,383,180 B2 | 6/2008 | Thumpudi et al. |
| 7,391,717 B2 | 6/2008 | Klemets et al. |
| 7,392,316 B2 | 6/2008 | Klemets et al. |
| 7,401,221 B2 | 7/2008 | Adent et al. |
| 7,409,145 B2 | 8/2008 | Antoun et al. |
| 7,424,730 B2 | 9/2008 | Chou |
| 7,433,746 B2 | 10/2008 | Puryear |
| 7,444,373 B2* | 10/2008 | Ludwig et al. ............ 709/204 |
| 7,444,419 B2 | 10/2008 | Green |
| 7,451,229 B2 | 11/2008 | Klemets et al. |
| 7,466,721 B2 | 12/2008 | Levi et al. |
| 7,471,827 B2* | 12/2008 | Xie et al. ............ 382/173 |
| 7,472,198 B2 | 12/2008 | Gupta et al. |
| 7,480,382 B2 | 1/2009 | Dunbar et al. |
| 7,483,532 B2 | 1/2009 | Alkove et al. |
| 7,492,769 B2 | 2/2009 | Klemets |
| 7,493,644 B1 | 2/2009 | Tanskanen |
| 7,505,485 B2 | 3/2009 | Sullivan et al. |
| 7,528,314 B2 | 5/2009 | Puryear |
| 7,529,541 B2 | 5/2009 | Cho et al. |
| 7,536,469 B2 | 5/2009 | Chou et al. |
| 7,538,267 B2 | 5/2009 | Puryear |
| 7,552,227 B2 | 6/2009 | Wang |
| 7,554,922 B2 | 6/2009 | Vega-Garcia et al. |
| 7,555,464 B2 | 6/2009 | Candelore |
| 7,558,472 B2 | 7/2009 | Locket et al. |
| 7,565,429 B1 | 7/2009 | Fernandez |
| 7,581,255 B2 | 8/2009 | Alkove et al. |
| 7,603,387 B2 | 10/2009 | Gates et al. |
| 7,616,569 B2* | 11/2009 | Saito ............... 370/232 |
| 7,631,015 B2 | 12/2009 | Gupta et al. |
| 7,631,039 B2 | 12/2009 | Eisenberg |
| 7,633,005 B2 | 12/2009 | Puryear |
| 7,644,172 B2 | 1/2010 | Stewart et al. |
| 7,663,049 B2 | 2/2010 | Puryear |
| 7,667,121 B2 | 2/2010 | Puryear |
| 7,672,240 B2* | 3/2010 | Johnson et al. ............ 370/235 |
| 7,672,743 B2 | 3/2010 | Messer et al. |
| 7,673,306 B2 | 3/2010 | Puryear |
| 7,673,315 B1 | 3/2010 | Wong et al. |
| 7,676,495 B2 | 3/2010 | Qian |
| 7,684,566 B2 | 3/2010 | Oliveira et al. |
| 7,720,908 B1 | 5/2010 | Newson et al. |
| 7,725,557 B2 | 5/2010 | Klemets et al. |
| 7,761,609 B1 | 7/2010 | Srinivasan et al. |
| 7,769,880 B2 | 8/2010 | Paka et al. |
| 7,774,388 B1* | 8/2010 | Runchey ............ 707/811 |
| 7,783,772 B2 | 8/2010 | Klemets |
| 7,783,773 B2 | 8/2010 | Wu et al. |
| 7,797,720 B2 | 9/2010 | Gopalakrishnan et al. |
| 7,809,851 B2 | 10/2010 | Klemets |
| 7,826,346 B2* | 11/2010 | Seki et al. ............ 370/216 |
| 7,839,895 B2 | 11/2010 | Sullivan et al. |
| 7,860,996 B2 | 12/2010 | Musayev et al. |
| 7,873,040 B2 | 1/2011 | Karlsgodt |
| 8,542,591 B2* | 9/2013 | Saito ............... 370/232 |
| 2002/0073084 A1 | 6/2002 | Kauffman et al. |
| 2002/0080786 A1* | 6/2002 | Roberts ............ 370/389 |
| 2002/0087634 A1 | 7/2002 | Ogle et al. |
| 2002/0095332 A1 | 7/2002 | Doherty et al. |
| 2002/0106033 A1* | 8/2002 | Uesugi ............... 375/262 |
| 2002/0118809 A1 | 8/2002 | Eisenberg |
| 2002/0122491 A1 | 9/2002 | Karcewicz et al. |
| 2002/0124051 A1* | 9/2002 | Ludwig et al. ............ 709/204 |
| 2002/0133547 A1 | 9/2002 | Lin et al. |
| 2002/0136406 A1 | 9/2002 | Fitzhardinge et al. |
| 2002/0138619 A1 | 9/2002 | Ramaley et al. |
| 2002/0141497 A1* | 10/2002 | Trovato ............ 375/240.03 |
| 2002/0143556 A1 | 10/2002 | Kadatch |
| 2002/0146102 A1 | 10/2002 | Lang |
| 2002/0154693 A1 | 10/2002 | Demos |
| 2002/0176624 A1 | 11/2002 | Kostrzewski et al. |
| 2002/0178138 A1 | 11/2002 | Ender et al. |
| 2002/0184391 A1 | 12/2002 | Phillips |
| 2002/0194608 A1 | 12/2002 | Goldhor |
| 2003/0005139 A1 | 1/2003 | Colville et al. |
| 2003/0007464 A1 | 1/2003 | Balani |
| 2003/0037103 A1 | 2/2003 | Salmi et al. |
| 2003/0055995 A1 | 3/2003 | Ala-Honkola |
| 2003/0061607 A1 | 3/2003 | Hunter et al. |
| 2003/0072370 A1 | 4/2003 | Girod et al. |
| 2003/0078972 A1 | 4/2003 | Tapissier et al. |
| 2003/0093530 A1 | 5/2003 | Syed |
| 2003/0110236 A1 | 6/2003 | Yang et al. |
| 2003/0110464 A1 | 6/2003 | Davidson et al. |
| 2003/0115041 A1 | 6/2003 | Chen |
| 2003/0115042 A1 | 6/2003 | Chen |
| 2003/0115050 A1 | 6/2003 | Chen |
| 2003/0115051 A1 | 6/2003 | Chen |
| 2003/0115052 A1 | 6/2003 | Chen |
| 2003/0125932 A1 | 7/2003 | Wang et al. |
| 2003/0135362 A1* | 7/2003 | Feng et al. ............ 704/205 |
| 2003/0158901 A1* | 8/2003 | Ludwig et al. ............ 709/205 |
| 2003/0172131 A1 | 9/2003 | Ao |
| 2003/0187919 A1* | 10/2003 | Nakamura et al. ............ 709/203 |
| 2003/0220972 A1 | 11/2003 | Montet et al. |
| 2003/0225832 A1* | 12/2003 | Ludwig ............ 709/204 |
| 2003/0233641 A1* | 12/2003 | Hank ............ 717/156 |
| 2003/0236905 A1 | 12/2003 | Choi et al. |

(56) References Cited

U.S. PATENT DOCUMENTS

| | | |
|---|---|---|
| 2003/0236906 A1 | 12/2003 | Klemets et al. |
| 2004/0098748 A1 | 5/2004 | Bo |
| 2004/0107255 A1* | 6/2004 | Ludwig et al. ............... 709/204 |
| 2004/0117427 A1 | 6/2004 | Allen et al. |
| 2004/0131340 A1 | 7/2004 | Antoun et al. |
| 2004/0172478 A1 | 9/2004 | Jacobs |
| 2004/0225744 A1* | 11/2004 | Frossard et al. ............. 709/231 |
| 2004/0268397 A1 | 12/2004 | Dunbar et al. |
| 2005/0002453 A1 | 1/2005 | Chang et al. |
| 2005/0009520 A1 | 1/2005 | Herrero et al. |
| 2005/0015259 A1 | 1/2005 | Thumpudi et al. |
| 2005/0015528 A1 | 1/2005 | Du |
| 2005/0016363 A1 | 1/2005 | Puryear |
| 2005/0024487 A1 | 2/2005 | Chen |
| 2005/0047503 A1 | 3/2005 | Han et al. |
| 2005/0050152 A1 | 3/2005 | Penner et al. |
| 2005/0066063 A1 | 3/2005 | Grigorovitch |
| 2005/0076039 A1 | 4/2005 | Ludwig et al. |
| 2005/0076136 A1 | 4/2005 | Cho |
| 2005/0084015 A1 | 4/2005 | Han et al. |
| 2005/0084166 A1 | 4/2005 | Boneh et al. |
| 2005/0105815 A1 | 5/2005 | Zhang et al. |
| 2005/0117641 A1 | 6/2005 | Xu et al. |
| 2005/0123058 A1 | 6/2005 | Greenbaum |
| 2005/0135484 A1 | 6/2005 | Lee |
| 2005/0157784 A1 | 7/2005 | Tanizawa et al. |
| 2005/0204385 A1 | 9/2005 | Sull et al. |
| 2005/0207734 A1 | 9/2005 | Howell |
| 2005/0234731 A1 | 10/2005 | Sirivara et al. |
| 2005/0234858 A1 | 10/2005 | Torii et al. |
| 2005/0246384 A1 | 11/2005 | Foehr et al. |
| 2005/0254508 A1 | 11/2005 | Aksu et al. |
| 2005/0267994 A1 | 12/2005 | Wong et al. |
| 2005/0268245 A1* | 12/2005 | Gipps et al. ................. 715/762 |
| 2006/0015637 A1 | 1/2006 | Chung |
| 2006/0020789 A1* | 1/2006 | Gipps et al. ................. 713/167 |
| 2006/0026294 A1 | 2/2006 | Virdi |
| 2006/0029065 A1 | 2/2006 | Fellman |
| 2006/0041616 A1* | 2/2006 | Ludwig et al. ............... 709/204 |
| 2006/0047779 A1 | 3/2006 | Deshpande |
| 2006/0059266 A1* | 3/2006 | Ludwig et al. ............... 709/228 |
| 2006/0062302 A1 | 3/2006 | Yin et al. |
| 2006/0088094 A1 | 4/2006 | Cieplinski |
| 2006/0114813 A1* | 6/2006 | Seki et al. .................... 370/208 |
| 2006/0126713 A1 | 6/2006 | Chou et al. |
| 2006/0136597 A1 | 6/2006 | Shabtai |
| 2006/0156363 A1 | 7/2006 | Wu et al. |
| 2006/0165166 A1 | 7/2006 | Chou |
| 2006/0168104 A1* | 7/2006 | Shimizu et al. .............. 709/218 |
| 2006/0184697 A1 | 8/2006 | Virdi |
| 2006/0206623 A1* | 9/2006 | Gipps et al. ................. 709/238 |
| 2006/0218264 A1* | 9/2006 | Ogawa et al. ................ 709/223 |
| 2006/0235883 A1 | 10/2006 | Krebs |
| 2006/0242080 A1 | 10/2006 | Van Dyke et al. |
| 2006/0242315 A1 | 10/2006 | Nichols |
| 2006/0248570 A1 | 11/2006 | Witwer |
| 2006/0270404 A1 | 11/2006 | Tuohino et al. |
| 2006/0282540 A1 | 12/2006 | Tanimoto |
| 2006/0282566 A1 | 12/2006 | Virdi et al. |
| 2006/0288099 A1 | 12/2006 | Jefferson et al. |
| 2007/0006064 A1 | 1/2007 | Colle |
| 2007/0037599 A1 | 2/2007 | Tillet et al. |
| 2007/0038873 A1 | 2/2007 | Oliveira et al. |
| 2007/0047650 A1* | 3/2007 | Vilei et al. ............... 375/240.16 |
| 2007/0058926 A1 | 3/2007 | Virdi |
| 2007/0061274 A1* | 3/2007 | Gipps et al. ................. 705/400 |
| 2007/0078768 A1 | 4/2007 | Dawson |
| 2007/0078933 A1* | 4/2007 | Ludwig et al. ............... 709/204 |
| 2007/0081586 A1 | 4/2007 | Raveendran et al. |
| 2007/0083593 A1* | 4/2007 | Ludwig et al. ............... 709/204 |
| 2007/0083595 A1* | 4/2007 | Ludwig et al. ............... 709/204 |
| 2007/0083886 A1 | 4/2007 | Kauffman et al. |
| 2007/0097816 A1 | 5/2007 | Van Gassel |
| 2007/0100891 A1 | 5/2007 | Nee |
| 2007/0130325 A1* | 6/2007 | Lesser ........................... 709/224 |
| 2007/0160133 A1 | 7/2007 | Bao et al. |
| 2007/0177632 A1* | 8/2007 | Oz et al. ...................... 370/486 |
| 2007/0192789 A1 | 8/2007 | Medford |
| 2007/0198931 A1 | 8/2007 | Ono et al. |
| 2007/0201374 A1* | 8/2007 | Qing et al. ................... 370/242 |
| 2007/0204321 A1 | 8/2007 | Shen et al. |
| 2007/0237152 A1* | 10/2007 | Zhu ............................... 370/392 |
| 2007/0274383 A1 | 11/2007 | Yu et al. |
| 2007/0276954 A1 | 11/2007 | Chan |
| 2008/0008098 A1* | 1/2008 | Saito ............................ 370/235 |
| 2008/0022005 A1 | 1/2008 | Wu |
| 2008/0037954 A1 | 2/2008 | Lee |
| 2008/0046939 A1 | 2/2008 | Lu et al. |
| 2008/0060029 A1 | 3/2008 | Park et al. |
| 2008/0086570 A1 | 4/2008 | Dey et al. |
| 2008/0091838 A1 | 4/2008 | Miceli |
| 2008/0107041 A1* | 5/2008 | Liu ............................... 370/252 |
| 2008/0126279 A1* | 5/2008 | Keeton et al. .................. 706/19 |
| 2008/0172441 A1 | 7/2008 | Speicher |
| 2008/0195743 A1 | 8/2008 | Brueck et al. |
| 2008/0195744 A1 | 8/2008 | Bowra |
| 2008/0195761 A1 | 8/2008 | Jabri et al. |
| 2008/0201386 A1 | 8/2008 | Maharajh et al. |
| 2008/0211901 A1 | 9/2008 | Civanlar et al. |
| 2008/0215390 A1* | 9/2008 | Gipps et al. ...................... 705/7 |
| 2008/0256085 A1 | 10/2008 | Lee et al. |
| 2008/0312923 A1 | 12/2008 | Crinon et al. |
| 2009/0006538 A1 | 1/2009 | Risney et al. |
| 2009/0007171 A1 | 1/2009 | Casey et al. |
| 2009/0043657 A1 | 2/2009 | Swift et al. |
| 2009/0043906 A1 | 2/2009 | Hurst et al. |
| 2009/0049186 A1 | 2/2009 | Agnihotri et al. |
| 2009/0055417 A1 | 2/2009 | Hannuksela |
| 2009/0076904 A1 | 3/2009 | Serena |
| 2009/0089401 A1 | 4/2009 | Zhang et al. |
| 2009/0132356 A1 | 5/2009 | Booth et al. |
| 2009/0132599 A1 | 5/2009 | Soroushian et al. |
| 2009/0132721 A1 | 5/2009 | Soroushian et al. |
| 2009/0168679 A1* | 7/2009 | Benjamim et al. ........... 370/312 |
| 2009/0199236 A1 | 8/2009 | Barrett et al. |
| 2009/0254672 A1 | 10/2009 | Zhang |
| 2009/0279605 A1 | 11/2009 | Holcomb et al. |
| 2009/0282162 A1* | 11/2009 | Mehrotra .............. H04L 65/607 709/233 |
| 2009/0282475 A1 | 11/2009 | George et al. |
| 2009/0297123 A1 | 12/2009 | Virdi et al. |
| 2009/0300145 A1 | 12/2009 | Musayev et al. |
| 2009/0300203 A1 | 12/2009 | Virdi et al. |
| 2009/0300204 A1 | 12/2009 | Zhang et al. |
| 2009/0319681 A1 | 12/2009 | Freelander et al. |
| 2009/0327424 A1* | 12/2009 | Bernstein et al. ............. 709/205 |
| 2009/0328124 A1 | 12/2009 | Khouzam et al. |
| 2010/0011119 A1 | 1/2010 | Knowlton et al. |
| 2010/0058061 A1 | 3/2010 | Folta et al. |
| 2010/0080290 A1 | 4/2010 | Mehrotra |
| 2010/0114921 A1 | 5/2010 | Bocharov et al. |
| 2010/0135636 A1 | 6/2010 | Zhang et al. |
| 2010/0153988 A1 | 6/2010 | Takai et al. |
| 2010/0158101 A1 | 6/2010 | Wu et al. |
| 2010/0180011 A1 | 7/2010 | Sood et al. |
| 2010/0189183 A1 | 7/2010 | Gu et al. |
| 2010/0191974 A1 | 7/2010 | Dubhashi et al. |
| 2010/0235472 A1 | 9/2010 | Sood et al. |
| 2010/0235528 A1 | 9/2010 | Bocharov et al. |
| 2013/0039448 A1* | 2/2013 | Kelin et al. ................... 375/341 |

OTHER PUBLICATIONS

Barker et al., "Dynamic Programming Based Smoothing of VBR Video Traffic," 10 pp. (document marked Mar. 6, 2002).

Caetano et al., "Rate Control Strategy for Embedded Wavelet Video Coders," *Electronic Letters*, pp. 1815-1817 (Oct. 14, 1999).

Chang et al., "BubbleUp: Low Latency Fast-Scan for Media Servers," Fifth ACM International Conference on Multimedia 1997, Nov. 1997, 12 pages.

Chavez et al., "Monitoring-Based Adaptive Overlay Streaming Media," printed from http://www.eecs.berkeley.edu/Programs/ugrad/superb/papers2003/Brian%20Chavez.pdf on Aug. 12, 2008.

(56) References Cited

OTHER PUBLICATIONS

Cheung et al., "A Comparison of Scalar Quantization Strategies for Noisy Data Channel Data Transmission," *IEEE Transactions on Communications*, vol. 43, No. 2/3/4, pp. 738-742 (Apr. 1995).
Crisafulli et al., "Adaptive Quantization: Solution via Nonadaptive Linear Control," *IEEE Transactions on Communications*, vol. 41, pp. 741-748 (May 1993).
Dai, "Rate-Distortion Analysis and Traffic Modeling of Scalable Video Coders," Dissertation, Texas A&M University, 172 pp. (Dec. 2004).
Dalgic et al., "Characterization of Quality and Traffic for Various Video Encoding Schemes and Various Encoder Control Schemes," Technical Report No. CSL-TR-96-701 (Aug. 1996).
Dolby Laboratories, "AAC Technology," 4 pp. [Downloaded from the web site aac-audio.com on World Wide Web on Nov. 21, 2001].
Fraunhofer-Gesellschaft, "MPEG Audio Layer-3," 4 pp. [Downloaded from the World Wide Web on Oct. 24, 2001].
Fraunhofer-Gesellschaft, "MPEG-2 AAC," 3 pp. [Downloaded from the World Wide Web on Oct. 24, 2001].
Gill et al., "Creating High-Quality Content with Microsoft Windows Media Encoder 7," 4 pp. (2000). [Downloaded from the World Wide Web on May 1, 2002.].
Girod et al., "Advances in channel-adaptive video streaming," <http://www.stanford.edu/~bgirod/pdfs/GirodWCMC2002.pdf>, 24 pages (2002).
Guo et al., "P2Cast: Peer-to-peer Patching Scheme for VoD Service," Proceedings of the 12th International Conference on World Wide Web, 2003, 9 pages.
Guo et al., "Practical Wyner-Ziv switching scheme for multiple bit-rate video streaming," <http://research.microsoft.com/~fengwu/papers/switching_icip_2006.pdf>, 249-252, 2006.
He et al., "A Unified Rate-Distortion Analysis Framework for Transform Coding," IEEE Transactions on Circuits and Systems for Video Technology, vol. 11, No. 12, pp. 1221-1236 (Dec. 2001).
Hsu et al., "Joint Selection of Source and Channel Rate for VBR Video Transmission Under ATM Policing Constraints," IEEE Journal on Selected Areas in Communications, vol. 15, No. 6, pp. 1016-1028 (Aug. 1997).
Hsu et al., "Rate Control for Robust Video Transmission over Burst-Error Wireless Channels," IEEE Journal on Selected Areas of Communication, vol. 17, No. 5, pp. 756-773 (May 1999).
Huang et al., "Adaptive Live Video Streaming by Priority Drop," Proceedings of the IEEE Conference on Advanced Video and Signal Based Surveillance, pp. 342-347, Jul. 21-22, 2003.
Huang et al., "Optimal Coding Rate Control of Scalable and Multi Bit Rate Streaming Media," Microsoft Research Technical Report, MSR-TR-2005-47, 26 pp. (Apr. 2005).
Huang et al., "Optimal control of multiple bit rates for streaming media," <http://nisl.wayne.edu/Papers/Tech/HuangCK04c.pdf>, *Picture Coding Symposium*, San Francisco, CA, 4 pages (Dec. 2004).
Jafarkhani et al., "Entropy-Constrained Successively Refinable Scalar Quantization," *IEEE Data Compression Conference*, pp. 337-346 (1997).
Jayant et al., "Digital Coding of Waveforms, Principles and Applications to Speech and Video," Prentice Hall, pp. 428-445 (1984).
Jenkac et al., "On Video Streaming over Variable Bit-rate and Wireless Channels," presented at Packet Video 2003, Nantes, France, Apr. 28-29, 2003, 11 pp.
Johansen, "Rate-Distortion Optimization for Video Communication in Resource Constrained IP Networks," Thesis, Norwegian University of Science and Technology, 161 pp. (Dec. 2007).
Kalman et al., "Rate-distortion optimized video streaming with adaptive playout," <http://www.standford.edu/~bgirod/pdfs/KalmanICIP2002.pdf>, 4 pages (2002).
Kammin et al., "Video multiplexing for the MPEG-2 VBR encoder using a deterministic method," <http://ieeexplore.ieee.org/ie15/4041313/4041314/04041354.pdf?isnumber=4041314&prod=CNF&arnumber=4041354&arSt=221&ared=228&arAuthor=Jasman+Kammin%3B+Kazuo+Ohzeki&htry=1>, 8 pages (Dec. 2006).
Li et al., "Optimal Linear Interpolation Coding for Server-Based Computing," Proc. IEEE Int'l Conf. on Communications, 5 pp. (2002).
Microsoft TechNet, "Streaming Media Services Role," Jan. 2008, 3 pages.
Mook, "Next-Gen Windows Media Player Leaks to the Web," *BetaNews*, 17 pp. (Jul. 19, 2002) [Downloaded from the World Wide Web on Aug. 8, 2003].
Naveen et al., "Subband Finite State Scalar Quantization," *IEEE Transactions on Image Processing*, vol. 5, No. 1, pp. 150-155 (Jan. 1996).
Ortega et al., "Adaptive Scalar Quantization Without Side Information," *IEEE Transactions on Image Processing*, vol. 6, No. 5, pp. 665-676 (May 1997).
Ortega, "Optimal bit allocation under multiple rate constraints," Proc. of the Data Compression Conf., 10 pp. (Apr. 1996).
Ortega et al., "Optimal Buffer-Constrained Source Quantization and Fast Approximation," *IEEE*, pp. 192-195 (1992).
Ortega et al., "Optimal Trellis-based Buffered Compression and Fast Approximation," *IEEE Transactions on Image Processing*, vol. 3, No. 1, pp. 26-40 (Jan. 1994).
Pao, "Encoding Stored Video for Streaming Applications," IEEE Transactions on Circuits and Systems for Video Technology, vol. 11, No. 2, pp. 199-209 (Feb. 2001).
Qazzaz et al., "Providing Interactive Video on Demand Services in Distributed Architecture," 29th Proceedings of the Euromicro Conference, pp. 215-222, Sep. 1-6, 2003.
Ramchandran et al., "Bit Allocation for Dependent Quantization with Applications to MPEG Video Coders," *IEEE*, pp. v-381-v-384 (1993).
Ratnakar et al., "RD-OPT: An Efficient Algorithm for Optimization DCT Quantization Tables," 11 pp.
Reader, "History of MPEG Video Compression—Ver. 4.0," 99 pp. (document marked Dec. 16, 2003).
Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).
Reibman et al., "Constraints on Variable Bit-rate Video for ATM Networks," IEEE Transactions on Circuits and Systems for Video Technology, No. 4, pp. 361-372 (1992).
Reibman et al., "Video Quality Estimation for Internet Streaming," downloaded from http://www.www2005.org/cdrom/docs/p1168.pdf on Aug. 22, 2008.
Rexford et al., "Online Smoothing of Live, Variable-Bit-Rate Video," IEEE, pp. 235-243 (May 1997).
Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).
Ronda et al., "Rate Control and Bit Allocation for MPEG-4," *IEEE Transactions on Circuits and Systems for Video Technology*, pp. 1243-1258 (1999).
Schulzrinne, "Operating System Issues for Continuous Media," ACM Multimedia Systems, vol. 4, No. 5, 13 pp. (Mar. 1996).
Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).
Sheu et al., "A Buffer Allocation Mechanism for VBR Video Playback," Communication Tech. Proc. 2000, WCC-ICCT 2000, vol. 2, pp. 1641-1644 (2000).
Sidiropoulos, "Optimal Adaptive Scalar Quantization and image Compression," *ICIP*, pp. 574-578 (1998).
Srinivasan et al., "High-Quality Audio Compression Using an Adaptive Wavelet Packet Decomposition and Psychoacoustic Modeling," *IEEE Transactions on Signal Processing*, vol. 46, No. 4, pp. 1085-1093 (Apr. 1998).

(56) References Cited

OTHER PUBLICATIONS

Srinivasan et al., "Windows Media Video 9: Overview and Applications," Signal Processing: Image Communication, vol. 19, pp. 851-875, Oct. 2004.

Sullivan, "Optimal Entropy Constrained Scalar Quantization for Exponential and Laplacian Random Variables," *ICASSP*, pp. V-265-V-268 (1994).

Sullivan et al., "Rate-Distortion Optimization for Video Compression,"*IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Sun et al., "Seamless Switching of Scalable Video Bitstreams for Efficient Streaming," IEEE Transactions on Multimedia, vol. 6, No. 2, pp. 291-303 (Apr. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Trushkin, "On the Design on an Optimal Quantizer," *IEEE Transactions on Information Theory*, vol. 39, No. 4, pp. 1180-1194 (Jul. 1993).

Tsang et al., "Fuzzy based rate control for real-time MPEG video," 12 pp. (1998).

Walpole et al., "A Player for Adaptive MPEG Video Streaming over the Internet," Proc. SPIE, vol. 3240, pp. 270-281 (1998).

Westerink et al., "Two-pass MPEG-2 Variable-bit-rate Encoding," *IBM J. Res. Develop.*, vol. 43, No. 4, pp. 471-488 (1999).

Wong, "Progressively Adaptive Scalar Quantization," *ICIP*, pp. 357-360 (1996).

Wu et al., "Entropy-Constrained Scalar Quantization and Minimum Entropy with Error Bound by Discrete Wavelet Transforms in Image Compression," *IEEE Transactions on Image Processing*, vol. 48, No. 4, pp. 1133-1143 (Apr. 2000).

Wu et al., "SMART: An Efficient, Scalable and Robust Streaming Video System," EURASIP on Applied Signal Processing, vol. 2, 39 pp. (Feb. 2004).

Wu et al., "Quantizer Monotonicities and Globally Optimally Scalar Quantizer Design," *IEEE Transactions on Information Theory*, vol. 39, No. 3, pp. 1049-1053 (May 1993).

Yang et al., "Rate Control for Videophone Using Local Perceptual Cues," *IEEE Transactions on Circuits and Systems for Video Tech.*, vol. 15, No. 4, pp. 496-507 (Apr. 2005).

Zhang et al., "Seamless Bit-Stream Switching in Multirate-Based Video Streaming Systems," EURASIP Journal on Applied Signal Processing, vol. 2006, No. 18, p. 1-11, 2006.

Zheng et al., "Multimedia Over High Speed Networks: Reducing Network Requirements with Fast Buffer Fillup," IEEE Globecom-98, Nov. 1998, 6 pages.

Hefeeda et al., "Rate-Distortion Optimized Streaming of Fine-Grained Scalable Video Sequences," ACM Trans. on Multimedia Computing Communications and Applications, vol. 4, No. 1, 28 pp. (Jan. 2008).

\* cited by examiner

FILES CONTAINING INDEX INFORMATION
- program description information
- File-level index information
- streaming segment index information

210

FILES CONTAINING STREAMING SEGMENTS

220

OPTIMIZED CLIENT SIDE RATE CONTROL AND INDEXED FILE LAYOUT FOR STREAMING MEDIA

BACKGROUND

With the increasing popularity of viewing and/or listening to content, such as music, shows, and movies, over the Internet, there is a need for optimizing the client's viewing experience. Because the Internet is a variable bitrate channel without dedicated bandwidth between the server and client, it is important to adjust the bitrate of the content being sent to the client.

For bitrate-switching streaming solutions that rely on server-side awareness of the needs of each specific client, additional server-side resources may be required. For example, locating bitrate selection decision making at the server may require additional server-side software and/or hardware resources. In addition, servers may require information about clients, such as client capabilities (e.g., hardware and software), and network bandwidth information.

Client bitrate selection of streaming media can be a complex problem. One solution is for a client to adjust its buffer to account for startup-delay and changes in network bandwidth during downloading of a fixed-bitrate stream covering a program. However, this solution can lead to rebuffering situations which interrupt the client viewing experience.

Therefore, there exists ample opportunity for improvement in technologies related to client side rate control and indexed file layout for streaming media.

SUMMARY

In summary, the detailed description is directed to various techniques and solutions for optimized client side rate control and indexed file layout for streaming media.

According to one aspect of the techniques and solutions described herein, an indexed file layout for segmented streaming of multimedia content comprises one or more files containing index information for a program. The index information can comprise program description information describing the program and streaming segment index information describing each streaming segment of the program. In addition, the layout can comprise one or more file containing streaming segments of the program, where the streaming segments are each encoded at one or more bitrates independently of other streaming segments of the program. The layout supports client switching between different bitrates at segment boundaries.

According to another aspect of the techniques and solutions described herein, a method for optimizing client-side rate control of streaming content comprises, for each of a plurality of states, selecting one or more available paths that end in the state, where the one or more available paths are those paths ending in the state that satisfy a constraint condition, selecting a best path to the state from the one or more available paths (e.g., based on a cost measure such as a distortion measure), and eliminating as available all of the one or more available paths other than the best path. The method can also comprise downloading (e.g., by a client from a server) one or more streaming segments encoded at bitrates corresponding to the best path through the plurality of states, where each of the plurality of states corresponds to a specific bitrate of a specific streaming segment.

According to yet another aspect of the techniques and solutions described herein, a method for optimizing client-side rate control of streaming content comprises, for each of a plurality of states, selecting one or more available paths that end in the state, where the one or more available paths are those paths ending in the state that satisfy a constraint condition, and retaining the one or more available paths as possible paths to be included in a best end-to-end path. The method also comprises performing an end-to-end analysis of the possible paths to determine the best end-to-end path, where the best end-to-end path has the lowest overall distortion. The method can also comprise downloading (e.g., by a client from a server) one or more streaming segments encoded at bitrates corresponding to the best end-to-end path through the plurality of states, where each of the plurality of states corresponds to a measure of client buffer fullness for a specific bitrate of a specific streaming segment.

The described techniques and tools for solutions for optimized client side rate control and indexed file layout can be implemented separately or in combination.

BRIEF DESCRIPTION OF THE DRAWINGS

FIG. 2 is a block diagram depicting an indexed file layout for segmented streaming.

DETAILED DESCRIPTION

Figure 1:
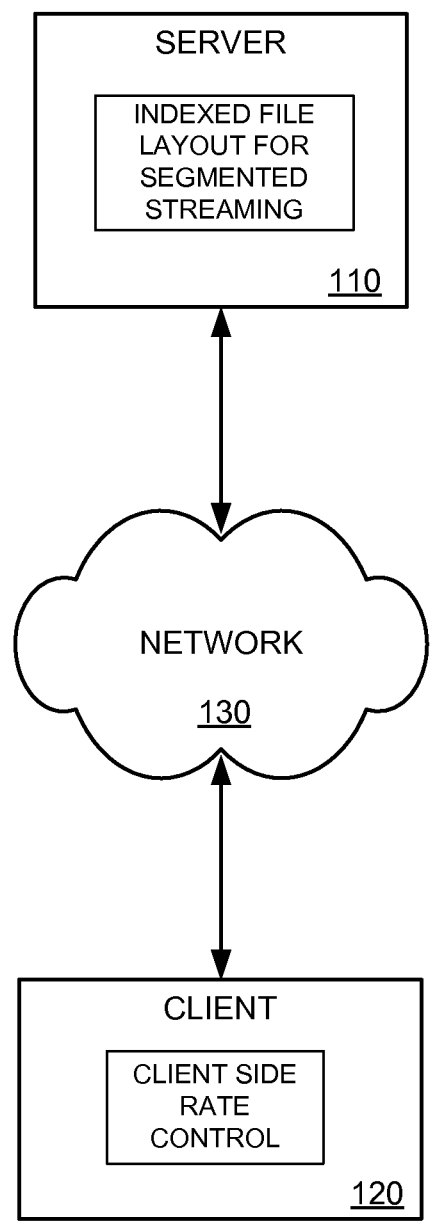
FIG. 1 is a block diagram of a system for segmented streaming of multimedia content using an indexed file layout.

The following description is directed to techniques and solutions for optimized client side rate control and indexed file layout for segmented streaming of multimedia content. The various techniques and solutions can be used in combination or independently. Different embodiments can implement one or more of the described techniques and solutions.

DISCUSSION OF TERMS

Program. A program is a self-contained piece of audio and/or video (e.g., multimedia) content. A program can contain multiple audio and/or video tracks. For example, a program could be a movie (e.g., comprising a stereo audio track, a multichannel surround sound audio track, and a video track), a video clip (e.g., comprising one or more audio and video tracks), or an audio recording (comprising one or more audio tracks).

Streaming segment. A streaming segment is a section of a program for a specific track, and a program is divided into one or more streaming segments. Each streaming segment is self-contained, meaning a client can start playback at the beginning of a streaming segment without reference to prior (or subsequent) streaming segments. Streaming segments define the boundaries at which a client can change the bitrate of the content it is downloading.

In a specific implementation, a streaming segment has the following constraints:

every video encoding used for streaming contains a closed Group of Pictures (GOP) boundary (key frame) at every streaming segment boundary each streaming segment touches (but does not overlap with) one or two other streaming segments all streaming segments combine to exactly cover the presentation time range of the entire program (i.e., streaming segments represent a complete non-overlapping segmentation of the program presentation time range)

File Segment. A file segment is a file-level organization of streaming segments. A file segment contains one or more streaming segments.

In a specific implementation, a file segment has the following constraints:

each file segment touches (but does not overlap with) one or two other file segments all file segments combine to exactly cover the presentation time range of the entire program the presentation time range corresponding to any given streaming segment is fully contained within the time range corresponding to some single file segment (i.e., no streaming segment may span multiple file segments)

Index information. Index information is meta-data information other than actual program content (encoded audio and/or video data). Index information can include program description information (e.g., program length, number and type of tracks, etc.), streaming segment index information (e.g., comprising size, quality, and complexity of steaming segments), and file-level index information.

I. Indexed File Layout

This section describes indexed file layout techniques and solutions that can be applied to segmented streaming of multimedia content. For example, indexed file layout solutions can include one or more of the following features and techniques: dividing a program into multiple streaming segments, providing a variable number of encoded bitrates per streaming segment, providing index information covering all available bitrates to facilitate pure client-side bitrate selection, and organization of streaming segments into files to provide efficient streaming of content.

In general, the file layout described herein can be used by standard HTTP servers to serve multimedia content at multiple bitrates with bitrate selection (rate control) being performed client-side (e.g., exclusively client-side). Clients can perform rate control by first obtaining index information from the server describing the various bitrates available for streaming segments of a program. Based on the index information, and possibly other information (e.g., network bandwidth, buffer information, etc.), the client can decide which bitrate streaming segments to download from the server to provide a desired user experience (e.g., the best user experience possible based on the available bitrates and current network conditions).

Other types of computing devices (e.g., other than traditional HTTP servers) can provide files using the indexed file layout described herein. For example, a computing device (e.g., a personal computer, server computer, or special-purpose streaming media server) can use the indexed file layout to serve multimedia content using various file serving protocols (e.g., File Transfer Protocol (FTP), Hypertext Transfer Protocol (HTTP), Real Time Streaming Protocol (RTSP), MMS (Microsoft Media Services), etc.).

In order to support bitrate switching, programs are divided into temporal chunks called streaming segments (self-contained units). The server stores each streaming segment at one or more bitrates (e.g., each streaming segment-bitrate combination is a separate streaming segment encoding). Each streaming segment includes one or more available bitrate encodings for a specific track (e.g., a specific audio track, such as an English audio track, or a specific video track) of a program. Clients then determine which bitrate, from the available bitrates (e.g., from the available streaming segment encodings), to download for each streaming segment. For example, a client may obtain a first streaming segment, for a video track, encoded at 250 Kb/sec (kilo-bits per second) (from one or more available streaming segment encodings for the first streaming segment), a second streaming segment, for the video track, encoded at 500 Kb/sec (from one or more available streaming segment encodings for the second streaming segment), and a third streaming segment, for the video track, encoded at 1 Mb/sec (mega-bit per second) (from one or more available streaming segment encodings for the third streaming segment). Each streaming segment encoding can be at a constant bitrate (CBR) or at a variable bitrate (VBR) (and the use of CBR and VBR can be mixed on a per streaming segment encoding basis).

FIG. 1 depicts a generalized block diagram 100 of a system for segmented streaming of multimedia content using an indexed file layout. In the diagram 100, a server 110 (e.g., a server computer system such as a standard HTTP server) provides multimedia content to a client 120 (e.g., a client computer system, such as a laptop or desktop computer, or another type of computing device, such as a PDA or mobile phone) via a network 130 (e.g., the Internet). In the diagram 100, the server 110 stores programs in an indexed file layout. The client 120 comprises client-side rate control software and/or hardware.

In a specific implementation, the server 110 is a standard HTTP server without any specialized streaming capability other than the ability to serve files. Because the server 110 does not support any specialized bitrate selection capability, the client 120 must perform all bitrate selection activities. In this implementation, the client 120 performs all bitrate selection activities. For example, the client 120 can perform rate control using the index information obtained from the server 110 (e.g., alone or in combination with other information, such as client buffer information, network bandwidth, etc.).

FIG. 2 is a block diagram 200 depicting an indexed file layout for segmented streaming. In the diagram 200, one or more files contain index information 210 and one or more files contain streaming segments 220. The index information 210 includes program description information, file-level index information, and streaming segment index information. In some implementations, some of the listed index information may not be present and/or other types of index information may be present in addition to the listed information. The streaming segments 220 are content files for streaming segments of a program (streaming segments of encoded audio and/or video tracks).

Figure 3:
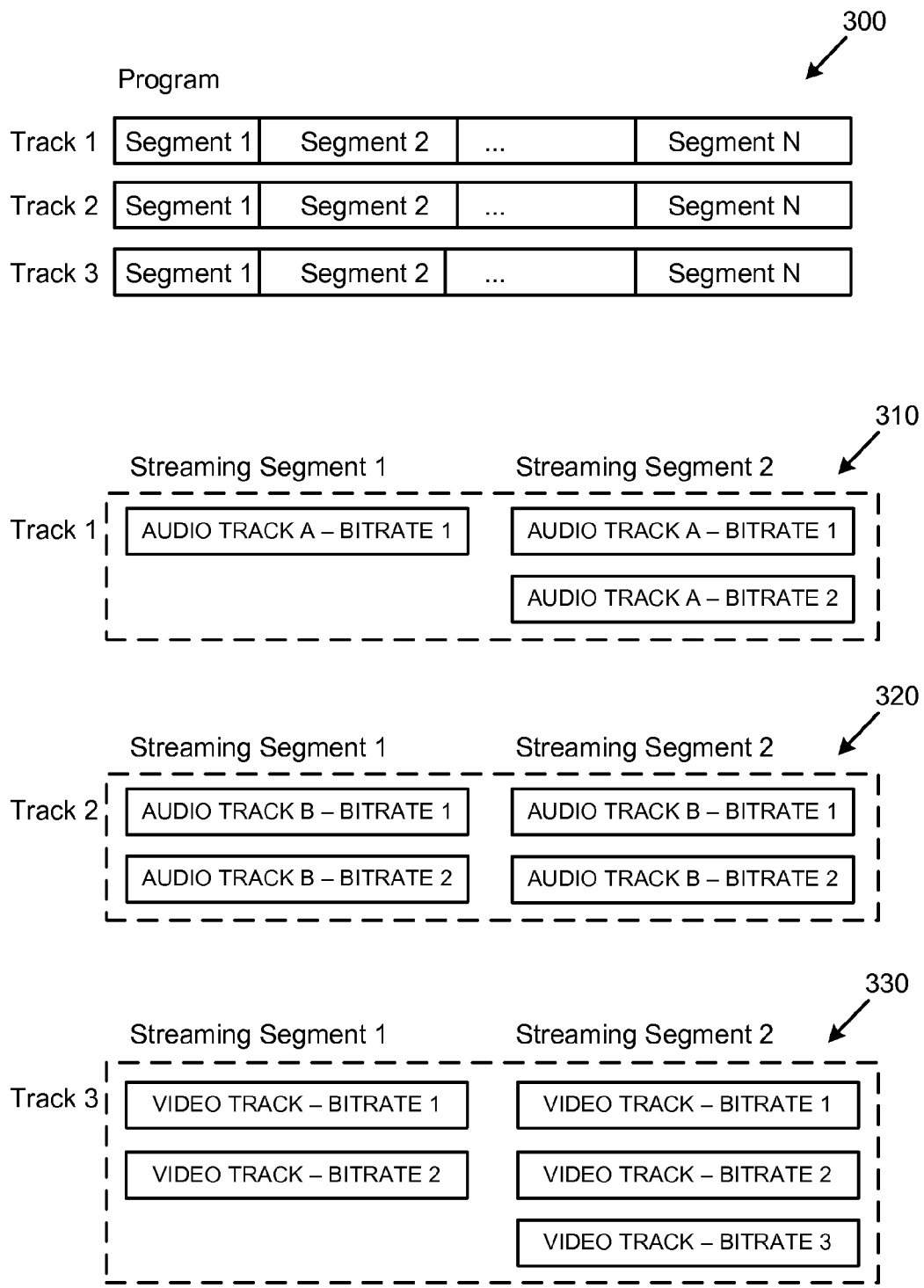
FIG. 3 depicts an example diagram of streaming segments.

FIG. 3 is a block diagram 300 depicting the organization of streaming segments. At 300, a program (e.g., a multimedia program with a number of audio and/or video tracks) is divided into streaming segments 1 through N for each track of the program. In general, a program can be divided into an arbitrary number of streaming segments. Each streaming segment includes the bitrate encodings for its audio or video tracks of the program for the period of the streaming segment. Each streaming segment can be encoded at a different number of bitrates, where each streaming segment encoded at a specific bitrate is a different streaming segment encoding. For example, streaming segment 1 of track 1 can be encoded at 128 Kb/sec (one available streaming segment encoding for streaming segment 1 of track 1). Streaming segment 1 of track 2 can be encoded at 96 Kb/sec and 192 Kb/sec (two available streaming segment encodings for streaming segment 1 of track 2).

At 310, example streaming segment encodings for track 1 are depicted. In the example, track 1 is an audio track (e.g., an English language audio track of the program). Streaming segment 1 of track 1 is encoded at one bitrate (e.g., 128 Kb/sec). Streaming segment 2 of track 1 is encoded at two bitrates (e.g., 96 Kb/sec and 192 Kb/sec), representing two available streaming segment encodings for streaming segment 2 of track 1.

At 320, example streaming segment encodings for track 2 are depicted. In the example, track 2 is a second audio track (e.g., a French language audio track of the program). Streaming segment 1 of track 2 is encoded at two bitrates (e.g., 128 Kb/sec and 192 Kb/sec), representing two available streaming segment encodings for streaming segment 1 of track 2. Streaming segment 2 of track 2 is also encoded at two bitrates (e.g., 128 Kb/sec and 256 Kb/sec), representing two available streaming segment encodings for streaming segment 2 of track 2.

At 330, example streaming segment encodings for track 3 are depicted. In the example, track 3 is video track. Streaming segment 1 of track 3 is encoded at two bitrates (e.g., 256 Kb/sec and 512 Kb/sec), representing two available streaming segment encodings for streaming segment 1 of track 3. Streaming segment 2 of track 3 is encoded at three bitrates (e.g., 200 Kb/sec, 400 Kb/sec, and 830 Kb/sec), representing three available streaming segment encodings for streaming segment 2 of track 3.

Allowing for different bitrate encodings between streaming segments can provide greater efficiency and quality of streaming multimedia content. For example, if the audio content of streaming segment 1 of track 1 is less complex, it can be encoded at fewer and/or lower bitrates. If the audio content of streaming segment 2 of track 1 is more complex, it can be encoded at more and/or higher bitrates.

Streaming segments can have the same start and stop time between tracks, or they can have different start and stop times. If streaming segments are generally aligned across tracks, then clients can easily switch bitrates at streaming segment boundaries. In some implementations, corresponding streaming segments of audio tracks and video tracks are closely (but not necessarily exactly) aligned. For example, in FIG. 3, streaming segment 2 of audio tracks 1 and 2 are closely (but not exactly) aligned with streaming segment 2 of track 3 (the video track).

Figure 4:
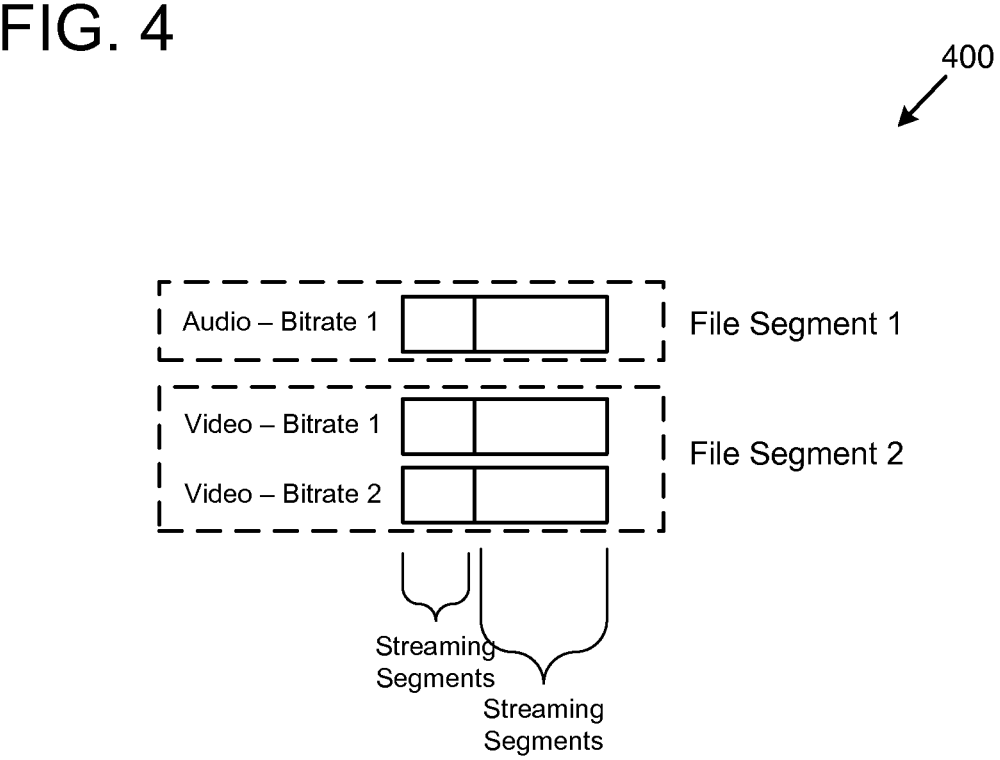
FIG. 4 depicts an example block diagram of file segments.

FIG. 4 is a block diagram 400 depicting file segments. In a specific implementation, the streaming segments of a program are organized by file segment. Each file segment contains one or more consecutive streaming segments for one or more tracks. All file segments of a program combine to cover the entire program.

In the example 400, a program (with one audio and one video track) has been divided into two file segments. File segment 1 includes two streaming segments of the audio track, encoded at one bitrate (e.g., 128 Kb/sec). File segment 2 includes two streaming segments of the video track, encoded at two bitrates (e.g., 256 Kb/sec and 512 Kb/sec).

A file segment are used to organize content into physical files. A physical file can be created by combining one or more file segments from one or more track.

Streaming segments are stored in files based on file segment. In a specific implementation, a separate physical file is used to store each set of streaming segments of a file segment for a specific bitrate. Using file segment 1 depicted in 400, the following files can be used to store the streaming segments:

file1.aud (contains both streaming segments of audio bitrate 1)

file1_bitrate1.vid (contains both streaming segments of video bitrate 1)

file1_bitrate2.vid (contains both streaming segments of video bitrate 2)

In another implementation, a separate physical file is used to store each set of streaming segments of the file segments on a per-track basis. Using file segment 1 depicted in 400, the following physical files would be used to store the streaming segments:

file1_aud.seg (contains both streaming segments of audio bitrate 1)

file1_vid.seg (contains both streaming segments of video bitrates 1 and 2)

In yet another implementation, a separate physical file is used to store each set of streaming segments of the file segments for more than one track (e.g., for all tracks of the program). Using file segment 1 depicted in 400, the following physical files would be used to store the streaming segments:

file1.seg (contains both streaming segments of audio bitrate 1 and video bitrates 1 and 2)

In some implementations, streaming segments are aligned across all audio and/or video tracks of a program. Aligning streaming segments allows for switching between available bitrates at segment boundaries. In general, video segment boundaries occur such that video segments are self-contained (e.g., boundaries occur at group-of-frame (GOP) boundaries).

In other implementations, streaming segments for audio and video can differ. For example, an audio track could be encoded at a single bitrate for the duration of a program (or for the duration of a file segment), while a video track could be encoded at multiple bitrates for the duration of the program (or for the duration of the file segment). For example, file segment 1 depicted in 400 could contain one streaming segment for the audio track (instead of the two depicted), and file segment 2 could contain and two streaming segments for the video track (as depicted).

Figure 5:
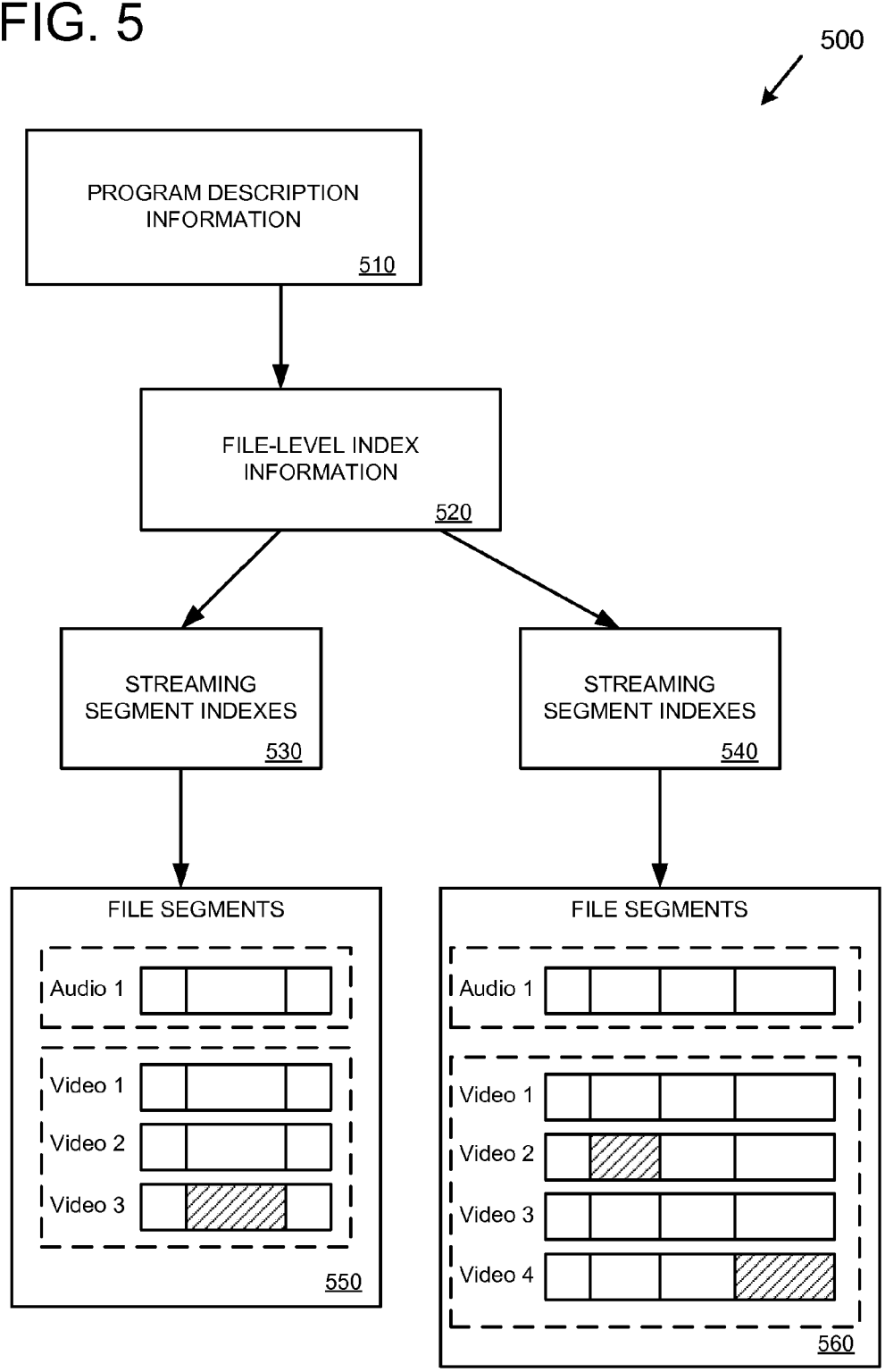
FIG. 5 depicts an example block diagram of an indexed file layout.

FIG. 5 is a block diagram 500 depicting an example indexed file layout. In general, the example layout 500 includes index information (510, 520, 530, and 540) describing the program, and encoded program content (streaming segments) 550 and 560.

The example file layout includes program description information 510 (e.g., general program information such as duration and track information). The example file layout includes file-level index information 520, describing the file segments of the program. The example file layout includes streaming segment indexes for the file segments of the program. In the example, two sets of streaming segment indexes are depicted, 530 and 540, for each of two sets of file segments. The example file layout also includes two sets of file segments 550 and 560.

In the example file layout 500, a first set of three streaming segments (550) is grouped into two file segments: one file segment covering an audio track at one bitrate and another file segment covering a video track at three bitrates. A second set of four streaming segments (560) is grouped into two file segments: one file segment covering the audio track at one bitrate and another file segment covering the video track at four bitrates.

The example indexed file layout 500 can be organized into files in various ways. For example, the program description information 510 and file-level index information 520 can be stored in a single file, or in two separate files. The streaming segment index information 530 and 540 can be stored in two separate files, or they can be stored in the same file as the file-level index information 520. Listed below in Table 1 is one way of storing the index information and program content:

TABLE 1

| File Name | Description |
| --- | --- |
| main.dat | Program description information 510 |
| index.dat | File-level index information 520 |
| index0.idx | Streaming segment index for file segments (530) |
| index1.idx | Streaming segment index for file segments (540) |
| file0.aud | Audio bitrate 1 for file segment (550) |
| file0.vid | Video bitrates 1-3 for file segment (550) |
| file1.aud | Audio bitrate 1 for file segment (560) |
| file1.vid | Video bitrates 1-4 for file segment (560) |

As depicted in the file segments 550 and 560, not all segment encodings must be present (those with hash marks have not been encoded and thus are not available to a client). For example, the second segment of video bitrate 3 (550) has not been encoded. One reason for not encoding the second segment of video at bitrate 3 could be that such an encoding would offer little improvement in quality over the encoding at bitrate 2 (e.g., the segment may cover a transition, such as a fade-in or fade-out). The fact that some encodings are not available can be indicated in the streaming segment indexes (530 and 540) so that the client will know that such bitrates are not available.

Example File Layout

In a specific implementation, the indexed file layout allows up to four types of files, as described below.
1. A single Program Description file (for a given program) containing:
    1.1 Overall program description information includes information such as full duration and what kind of data the file contains (audio, video, what kind of audio—stereo, multichannel, how many languages, which streams are encoded using multiple bitrates, etc).
    1.2 For each high-level (user-exposed, such as audio or video) track, information about whether the Main Program Index for that track is contained in the program description file or in a separate file (in which case a partial file name is also specified, enabling the client to derive the full path to the main index file).
    1.3 Optionally, the Main Program Index(es) (unless 1.2 indicates that it is in a separate file). If present, this follows the same format as 2 below.
2. Optionally (depending on 1.2), a separate file containing the Main Program Index containing:
    2.1 Optionally, a File Level index.
    2.2 Optionally a Streaming Segment Index describing all of the Streaming Segment encodings and bitrates available within the entire Program.
        Note: At least one of {2.1, 2.2} must be present.
3. Optionally, a number of Streaming Segment Index files (one for each File Segment) describing, for each File Segment, all of the Streaming Segment encodings and bitrates available within that File Segment. The filename of each Streaming Segment Index files must be derivable in some predictable fashion and contain the index (number) of the File Segment.
    Note: Either 3 or 2.2 must be present.
4. A number of Multimedia Data files containing compressed multimedia data. The filename of each Multimedia Data file must be derivable in some predictable fashion and contain the index (number) of the File Segment, as well as the index (number) of the bitrate contained in the file.

In this specific implementation, the File-Level Index (2.1) is a simple mapping of presentation time to File Segment. It is an array of start presentation times (or, equivalently, presentation durations) for each File Segment. In the event that all File Segments have equal durations, File-Level Index can be special-cased using a single value specifying the fixed File Segment Duration.

In the specific implementation, the Streaming Segment Index (2.2 or 3) contains the following information for each Streaming Segment. All fields are equally applicable in the context of 2.2 as well as in the context of 3, unless otherwise noted.
    2.2.1 Start presentation time (or, equivalently, duration) of the Streaming
        Segment. If presentation time, the base (frame of reference) for this presentation time is different depending on where the streaming-segment-level index is found. For a complete streaming-segment-level index found in a main program index file (2.2), the presentation time is relative to the beginning of the entire program. For a streaming-segment-level index found in File Segment index files (3), the presentation time is relative to the beginning of that File Segment.
    2.2.2 (Applicable to 2.2 only—n/a for 3) in a Streaming Segment index covering the entire program, the index (number) of the File Segment to which this Streaming Segment corresponds.
    2.2.3 The number of different bitrate encodings available for the streaming segment.
    2.2.4 For each bitrate encoding of a Streaming Segment, the following additional information:
        2.2.4.1 Some (possibly lossily compressed, approximate) representation of the size in bytes of that encoding.
        2.2.4.2 For video, the coded screen resolution (dimensions) used in that encoding.
        2.2.4.3 Some measure of the coded quality. This may be a scalar or a vector depending on whether "quality" is a single number appropriate for all use scenarios or a function of some parameters of the use scenario such as actual playback device screen resolution.
        2.2.2.4 Optionally, some measure of the decoding complexity (e.g., millions of instructions) of the encoding.
        2.2.2.5 File offset (into the audio or video data file) of the data corresponding to this Streaming Segment. This field may be omitted if the File Segment to Streaming Segment mapping is 1-to-1.

Both types of index files can be compressed to reduce index file sizes. At the very least, timestamps (if stored as presentation times as opposed to durations) and file offsets (2.2.2.5) should undergo differential coding. Some other fields (likely 2.2.4.2 and 2.2.4.3) should be coded using type-specific techniques (e.g., as enums) taking into account the set of possible values. All fields could further undergo entropy coding.

In alternative implementations, it may be advantageous to organize the index files differently (or store slightly different information) for different target client platforms, e.g., PC clients vs. portable devices. The Multimedia Data files do not have to be stored separately in such a case—i.e., multiple (independent) sets of Program Description and Index files could point to the same underlying set of Multimedia Data files. To make this possible, some portion of the Multimedia Data file naming scheme could be stored in the Program Description or Index files.

II. Client Side Rate Control

This section describes client side rate control (e.g., optimal client side rate control) techniques and solutions that can be applied to streaming of multimedia content (e.g., programs or pieces of programs). Client side rate control can be performed using the indexed file layout techniques and solutions described herein. For example, a client system (e.g., computer or other type of computing device) can download indexed information from a server and use the downloaded indexed information to select which bitrate to download for each segment. Using the techniques and solutions described in this section enables pure client-side bitrate selection without any special logic required at the server-side (other than standard file-serving capabilities, such as found on an HTTP server). More details regarding client side rate control techniques and solutions are described below.

Suppose we have M units of compressed data, each taking $b[c,n]$ bits where $c=0, 1, \ldots, C[n]-1$, where $C[n]$ is the number of possible rates available for the n'th unit, and $n=0, 1, \ldots, M-1$. Suppose for each of these units of compressed data, we also have a distortion function that we wish to minimize and that the distortion function is additive, given by $d[c,n]$. Suppose each unit of compressed data corresponds to $t[n]$ units of time and suppose that the average bitrate that can be transmitted across the channel over this time period is given by $R[c,n]$ bits/second which will be a function of network conditions, the amount of time, and also a function of the bitrate being requested. In many cases, we can assume the channel rate to not be a function of c, that is $R[c,n]=R[n]$ for all c. However, there may be certain cases where this is not true. For example in a content delivery network (CDN), some bitrate versions of the units may be cached closer to the client in which case the bitrate between client and server can be a function of not only network conditions, but also a function of the content. In the most general case, we can assume it to be a function of the content. Corresponding to this rate we can compute the approximate time that it takes to download each unit. Let $s[c,n]=b[c,n]/R[c,n]$ be the time it takes to download the unit c'th unit at time n.

Suppose a client chooses to download unit $u[n]$ for the n'th unit. Then the cumulative distortion that the client will have is given by:

$$D = \sum_{i=0}^{M-1} d[u[i], i]. \quad \text{Equation 1}$$

The goal of an optimal rate control algorithm is to minimize D subject to the constraints that the decoder buffer never glitches for more than the desired time period given the start-up latency and network conditions. Suppose the maximum start up latency is given by $T_0$ seconds, and that the maximum glitch time is given by $T_g$ seconds. If $T_g=0$, then the constraints essentially can be stated as:

1. Time to download first unit is less than or equal to $T_0$
2. Time to download first two units is less than or equal to $T_0+t[0]$
3. Time to download first three units is less than or equal to $T_0+t[0]+t[1]$
4. And so on . . . .

The cumulative value of the durations is also referred to as the "timestamp" of a given chunk which is often present in streams. That is $\Sigma_{i=0}^{n-1} t[i]$ is often called the timestamp of chunk n and is stored in the packet payload headers. This can be stated as:

$$T_0 + \sum_{i=0}^{n-1} t[i] \geq \sum_{i=0}^{n} s[u[i], i]. \quad \text{Equation 2}$$

This constraint has to be satisfied for all n, which can alternatively be written in terms of decoder buffer fullness given by:

$$f_d[n] = T_0 + \sum_{i=0}^{n} t[i-1] - s[u[i], i] \geq 0,$$

which has to be satisfied for all $n \geq 0$. The first unit constraint is for n=0, where $t[-1]=0$. An alternative representation for the decoder buffer fullness is given by the following recursive equation:

$$f_d[n]=f_d[n-1]+t[n-1]-s[u[n],n],$$

with the initial condition:

$$f_d[-1]=T_0.$$

If the n'th unit is allowed to glitch for $T_g[n]$ seconds, then we can write the constraint in a recursive way using the following decoder buffer fullness:

$$g_d[n] = f_d[n-1] + t[n-1] - s[u[n], n] \quad \text{Equation 3}$$

$$f_d[n] = \begin{cases} -\infty & \text{if } g_d[n] < -T_g[n] \\ 0 & \text{if } -T_g[n] \leq g_d[n] \leq 0 \\ g_d[n] & \text{if } g_d[n] > 0 \end{cases}.$$

The client has to choose $u[n]$ to satisfy $f_d[n] \geq 0$ while minimizing D.

Also, the actual buffer fullness that the decoder has may be different simply because the decoder only knows the estimated download time for each chunk and does not know the actual download time. Suppose at any given instant the decoder knows the actual buffer fullness. Then, based upon the estimates for download time for each component it can make a decision into the future as to which units to download.

The problem of minimizing D subject to the buffer constraint $f_d[n] \geq 0$ for all n can be solved using dynamic programming. Suppose we find the minimum distortion possible that satisfies the buffer constraint and such that $u[M-1]=c$ for all possible $c=0, 1, \ldots, C[M-1]-1$. The minimum distortion will be the minimum of all such distortions. Now the problem becomes finding the minimum possible distortion with the buffer constraint and with an additional constraint that u[n]=c. Such a minimization problem can be solved using a trellis to store relevant information needed in the optimization.

Since the distortion being minimized is assumed to be additive, a solution to find the optimal path can be done using a trellis. Suppose the decoder has a buffer fullness of $f_d[N_0]$ after downloading some number of units. In addition, suppose it knows distortion d[c,n] and an estimate of the download time s[c,n] for all c for n=$N_0$+1, $N_0$+2, . . . , $N_0$+M. Without loss of generality assume $N_0$=0. Define the following:

1 Let D[c,n] be the minimum distortion which can be achieved without glitches such that u[n]=c. If no such solution exists, let D[c,n] be the minimum distortion that can be achieved while minimizing the total glitch time.
2 Let g[c,n] be the total glitch time achieved when doing 1.
3 Let $f_{d,c}$[c,n] be the decoder buffer fullness when doing 1.
4 Let $u_c$[c,n] be the set of optimal encodings chosen when doing 1.
5 Let C[n] be the number of rates available at time n.
6 Let t[n] be the duration of unit n.
7 Let d[c,n] be the distortion of the c'th unit n.
8 Let s[c,n] be the estimated download time of the c'th unit n.

Then it can try to make an optimal decision as to which units to download up to the $N_0$+M unit. Then, by definition, since the distortion is additive, we can write $$D[c,n] = \begin{cases} \min_{l \in \gamma[c,n]}(D[l, n-1]) + d[c,n] & \text{if } |\gamma[c,n]| \geq 1 \\ \min_{l \in \sigma[c,n]}(D[l, n-1]) + d[c,n] & \text{if } |\gamma[c,n]| = 0 \end{cases} \quad \text{Equation 4}$$

where $\gamma_n$ is the set of l from l=0, 1, . . . , C[n-1]-1 which satisfy the buffer constraint and which contain no glitches. That is:

$$\gamma[c,n] = \quad \text{Equation 5}$$
$$\{l \mid l = 0, 1, \ldots, C[n-1] - 1 \cap f_{d,c}[l, n-1] + t[n-1] - s[c,n] \geq -T_g[n] \cap g[l, n-1] = 0\}.$$

If no such set exists, i.e. cardinality of it is 0, then we take the minimum over those l which satisfy the minimum glitch above the allowed glitches, that is:

$$\sigma[c,n] = \{l \mid l = 0, 1, \ldots, \quad \text{Equation 6}$$
$$C[n-1] - 1 \cap (T_g[n] - \min(f_{d,c}[l, n-1] + t[n-1] - s[c,n], -T_g[n]) + g[l, n-1]) = g_{min}\}.$$

Where:

$$g_{min}[c,n] = \min_{l=0,1,\ldots C[n-1]-1} T_g[n] - \quad \text{Equation 7}$$
$$\min(f_{d,c}[l, n-1] + t[n-1] - s[c,n], -T_g[n]) + g[l, n-1]$$

Let:

$$l_{min}[c,n] = \begin{cases} \operatorname*{argmin}_{l \in \gamma[c,n]}(D[l, n-1]) + d[c,n] & \text{if } |\gamma[c,n]| \geq 1 \\ \operatorname*{argmin}_{l \in \sigma[c,n]}(D[l, n-1]) + d[c,n] & \text{if } |\gamma[c,n]| = 0 \end{cases} \quad \text{Equation 8}$$

Then, the updates for Equations 2, 3, and 4 can be done using:

$$g[c,n] = \begin{cases} 0 & \text{if } |\gamma[c,n]| \geq 1 \\ g_{min}[c,n] & \text{if } |\gamma[c,n]| = 0 \end{cases} \quad \text{Equation 9}$$

$$f_{d,c}[c,n] = \max(f_{d,c}[l_{min}[c,n], n-1] + t[n-1] - s[c,n], 0)$$

$$u_c[c,n] = \{u_c[l_{min}[c,n], n-1], c\}$$

For the initial condition, we can assume:

C[0]=1

D[0,0]=0 g[0,0]=0

$f_{d,c}$[0,0]=$f_d$[$N_0$]

u[0,0]={0}  Equation 10

Once the algorithm updates are run from n=1, . . . , M, the optimal distortion can be found using:

$$D = \begin{cases} \min_{c \in \gamma} D[c, M] & \text{if } |\gamma| \geq 1 \\ \min_{l \in \sigma} D[c, M] & \text{if } |\gamma| = 0 \end{cases} \quad \text{Equation 11}$$

where γ is the set of c from c=0, 1, . . . , C[M-1]-1 which satisfy the buffer constraint without any glitches.

γ={c|c=0,1, . . . ,C[M-1]-1∩g[c,M]=0}. Equation 12

If the cardinality of this set is 0 (i.e. no glitchless solution exists), then the minimum distortion solution us chosen which achieve the minimum glitch.

$$\sigma = \{c \mid c = 0, 1, \ldots, C[M-1] - 1 \cap g[c, M] = g_{min}\}. \quad \text{Equation 13}$$

Where:

$$g_{min} = \min_{c=0,1,\ldots C[M-1]-1} g[c, M]. \quad \text{Equation 14}$$

Let:

$$c_{min} = \begin{cases} \operatorname*{argmin}_{c \in \gamma} D[c, M] & \text{if } |\gamma| \geq 1 \\ \operatorname*{argmin}_{l \in \sigma} D[c, M] & \text{if } |\gamma| = 0 \end{cases} \quad \text{Equation 15}$$

Then, the optimal selection of rates is given by:

u={u[n]|n=0, . . . ,M}, where:

u=$u_c$[$c_{min}$,M]

u[n]=$u_c$[$c_{min}$,M][n]  Equation 16

Note that in the equations above we could simply use the definition of σ for the set γ since if |γ|≥1, then the minimum glitch by definition will be 0, which would simplify the equations a bit. However, since different definitions for the "optimal" solution could be used when there is a glitch such as minimizing the number of glitches or minimizing the maximum glitch time, we have left the two sets as separate.

Pseudocode for the algorithm can be the following if for purposes of simplicity we assume $N_0=0$.

```
Set initial conditions as defined above in Equation 10
For n=1 to M
    For c=0 to C[n] − 1
        Find optimal solution ending in state c at unit n using
            Equations 4-8 by looping over 1
        Update variables for state (c,n) using Equation 9
    End
End
Find optimal solution ending in state M using Equations 11-16.
```

Using the above pseudocode, the optimal path can be found. If there are changes in decoder buffer fullness due to differences in the estimated time it takes to download a unit vs. the actual time it takes to download a unit, or if there are updates to the estimates themselves, the algorithm can be rerun with the current state.

Several other modifications could be done. If the player speed is different than the actual time, i.e. in trick play modes such as fast forward or fast play, then the time axis can be easily scaled when running the algorithm to compensate for this. For example, when playing at 2×, a 5 second decoder buffer can be thought of as only being 2.5 seconds, and a 10 second unit duration can be thought of as only being 5 seconds.

Also, since download times are usually only estimates, we can come up with a probability distribution on the download time, that is treat s[u[n], n] as a random variable with some probability distribution. In the trellis, instead of choosing whether the decoder will definitely starve or not, we can simply change the buffer constraint to be something like the following, Probability$(f_d[n] \geq 0) > 1-\epsilon$, where $\epsilon$ is some small value.

This basically means that we will likely choose the worst case estimate for download time which would force the client to make very conservative decisions when the buffer is small but allow larger bitrates to be downloaded as the buffer grows. In the pseudocode, the only thing that would change is that Fullness$>=-T_g[n]$ Would be replaced by Probability(Fullness$>=-T_g[n]) > 1$-epsilon.

This is essentially the same as choosing a value S for s[c,n] such that:

Probability$(s[c,n] > S) < \epsilon$ when running the trellis. However, based upon the actual value for s[c,n], the decoder buffer should be correctly adjusted before making future decisions so as to not let the worst case estimate affect future decisions.

For the distortion metric, various metrics could be chosen such as mean square error. Simpler metrics such as lost bit throughput could also be used for the distortion metric.

Optimality of Solution

The distortion metric chosen can determine the optimality of the solution arrived at by using the dynamic programming approach described above. If the distortion d[c,n] of units across bitrates c=0, 1, ..., C[n]−1, is different by orders of magnitude, then the algorithm is likely to yield the optimal solution under practical conditions. If the distortions are not different by orders of magnitude, then the algorithm could yield a sub-optimal solution, because of the nature of the trellis.

In Equation 4, since γ is a function of c (i.e. the units in stage n that are available for download, depend on the buffer fullness $f_{d,c}[c, n-1]$ after downloading unit c in stage n−1), it is possible that a unit with low distortion in stage n becomes un-available to satisfy the no-glitch condition. This precludes this unit from being a part of the solution.

A potential solution to this problem is to not use just the distortion as a cost function at each stage, and instead use a function of the distortion and buffer fullness as the cost function. Such a cost function, and its impact on the optimal solution under practical network conditions is to be determined.

Practical Considerations

In practical implementations, network conditions are bound to keep varying as units of compressed data are downloaded. This means that the estimated time, s[c,n], taken to download the c'th unit n, will keep varying as new estimates of the network bandwidth are computed. Thus the optimal path needs to be re-computed using the algorithm described above each time a new network bandwidth estimate is computed. In order to reduce the computation required, the loop in the above algorithm, need not be run from n=1 ... M, and instead can be stopped at stage $n=n_{end}$ on equation 8, when it is found that $l_{min}[c,n]=k$, where $\{c|c=0,1, \ldots, C[n]-1\}$ and $n=n_{end}$ and $k$ is a constant.

In other words the dynamic programming loop should be run until only one of the candidate paths survives. Once the surviving path is identified, $u_c[c_{min}, 0]$, identifies the first unit to be downloaded.

Alternative Solution

As an alternate solution to solve the optimality issue raised in the above algorithm, with slightly increased complexity, the definition of a state is changed. Instead of defining the states to be the various bitrates available for a given streaming segment, define the states to the various levels of decoder buffer fullness at a given time instant. Define $\theta_n$ be the set of P[n] quantized decoder buffer fullness states available at time n. For example, $\theta_n[0]=[0,0.1)$ is the state where the decoder buffer fullness is between 0 and 0.1 seconds. Let d[p, n] be the minimum distortion possible at time n when the decoder buffer fullness is contained in $\theta_n[p]$. Let $f_d[p, n]$ be the actual decoder buffer fullness corresponding to this. To run the optimization algorithm we can simply do:

$D[p,n]=\min(D[l,n-1]+d[c,n])$

Where $(l,c) \in \gamma_{p,n}$, where:

$\gamma_{p,n}=\{(l,c)|l=0,1,\ldots,P[n-1]-1, c=0,1,\ldots C[n]-1, f_d[l,n-1]+t[n-1]-s[c,n] \in \theta_n[p]\}$.

Let:

$(l_{min}[p,n], c_{min}[p,n])=\mathrm{argmin}(D[l,n-1]+d[c,n])$.

Then the decoder buffer fullness is updated according to:

$f_d[p,n]=f_d[l_{min}[p,n],n-1]+t[n-1]-s[c_{min}[p,n],n]$.

The optimal decoder path is updated according to:

$u_c[p,n]=\{u_c[l_{min}[p,n],n-1],c\}$.

As before, we do end up eliminating possible paths which satisfy the constraint due to taking the minimum distortion path into each state. However, if the quantization of the buffer states is done fine enough, the suboptimality is reduced. For example, if we did not quantize the set of possible buffer states, the algorithm would be optimal since we truly minimize the distortion for the given buffer constraints.

In addition, since smaller buffer states are more likely important in determining an optimal path (since if the buffer is large, the optimal thing to do is to try to simply take the largest bitrate, smallest distortion choice), it is recommended that the buffer states in this algorithm be unequally spaced. For example, the first buffer state can be [0,0.1), the second could be [0.1, 0.3), the third could be [0.3, 0.7), and so on, so that larger buffer states have larger quantization width.

Example

Consider the following simple example. Suppose we have 4 streaming segments, with the following distortions, durations, and estimated download times.

T0 = initial latency = 5
Durations = t[1] t[2] t[3] t[4] = 1 1 2 2
Number of bitrates available = C[1] C[2] C[3] C[4] = 3 3 4 2
Distortion for each streaming segment (first row gives distortion for each of 3 bitrates for first segment)
d[i,j] =
3 2 1
3 2 1
4 3 2 1
3 1
Estimated download time for each steaming segment (first row gives distortion for each of 3 bitrates for first segment)
s[i,j]=
1 2 3
1 2 3
1 2 3 4
2 3
Total distortion for each state at time n = 1,2,3,4
D[c,1]=
3
2
1
D[c,2]=
4
3
2
D[c,3]=
6
6
6
5
D[c,4]=
9
7
Total glitch time for each state at time n = 1,2,3,4
g[c,1]=
0
0
0
g[c,2]=
0
0
0
g[c,3]=
0
0
0
1
g[c,4]=
0
1

-continued

Decoder buffer fullness
f_d[c,1]=
4
3
2
f_d[c,2]=
2
1
0
f_d[c,3]=
0
0
0
0
f_d[c,4]=
0
0
Optimal path ending in state c
u[c,1]=
0
1
2
u[c,2]=
2 0
2 1
2 2
u[c,3]=
2 2 0
2 1 1
2 0 2
2 0 3
u[c,4]=
2 2 0 0
2 2 0 1

Total minimum distortion by the algorithm is 9 since that is the minimum glitch free distortion returned. A full exhaustive search shows that the minimum distortion is 8 which can be found using the second solution.

Using the second solution, assume P[n]=3, 5, 5, 5 is the number of decoder buffer fullness states available.

Decoder buffer fullness and set of possible buffer fullness states $\theta_n$ (no buffer fullness quantization is done).

f_d[p,1]=
2
3
4
f_d[p,2]=
0
1
2
3
4
f_d[p,3]=
0
1
2
3
4
f_d[p,4]=
0
1
2
3
4
Total distortion
D[p,1]=
1
2
3

```
D[p,2] =
2
3
4
5
6
D[p,3]=
6
7
8
9
10
D[p,4]=
8
9
10
11
13
Optimal path (state here refers to buffer fullness state)
u[p,1]=
0
1
2
u[p,2]=
0 0
0 1
0 2
1 3
2 4
u[p,3]=
0 0 0
0 1 1
0 2 2
1 3 3
2 4 4
u[p,4]=
0 1 1 0
0 2 2 1
1 3 3 2
2 4 4 3
2 4 4 4
```

Figure 6:
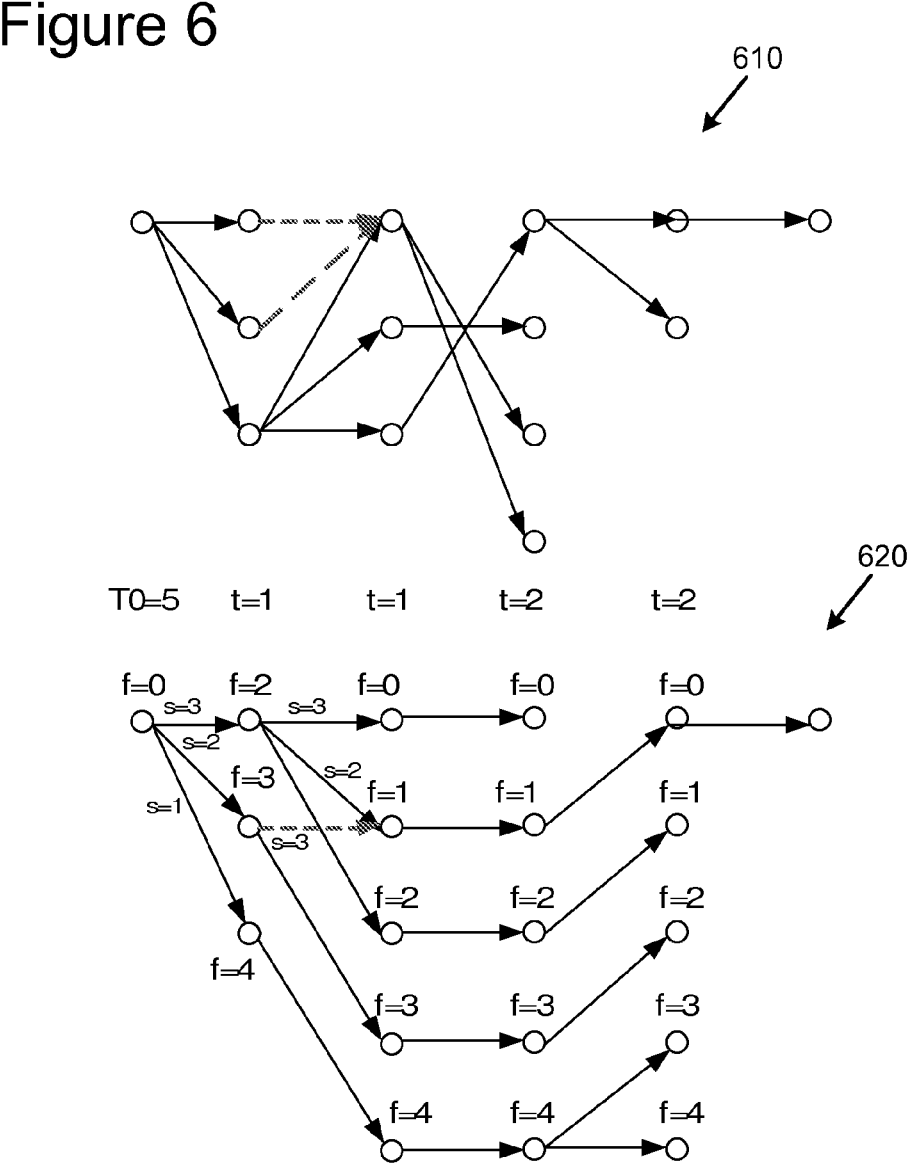
FIG. 6 depicts example rate control states.

The two algorithms can be shown using the diagrams depicted in FIG. 6, where each dot represents a state, and the "optimal" state transitions are shown by solid lines. Some non-optimal paths are also shown as dashed lines. In the first case 610 (representing the first algorithm described above), there will always be a path from all states at n−1 to all states at n since the states represent possible bitrates. With the second algorithm 620, this will not be the case since there will not be possible path from all buffer states at n−1 to buffer states at n. The first dot in the first column represents "n=0" and is only used for initialization. Similarly, the single dot in the last column is choosing of the optimal path. On the diagrams, "t=duration", "s=estimated time to download", "T0=initial delay", and "f=decoder buffer fullness".

III. Example Computing Environment

Figure 7:
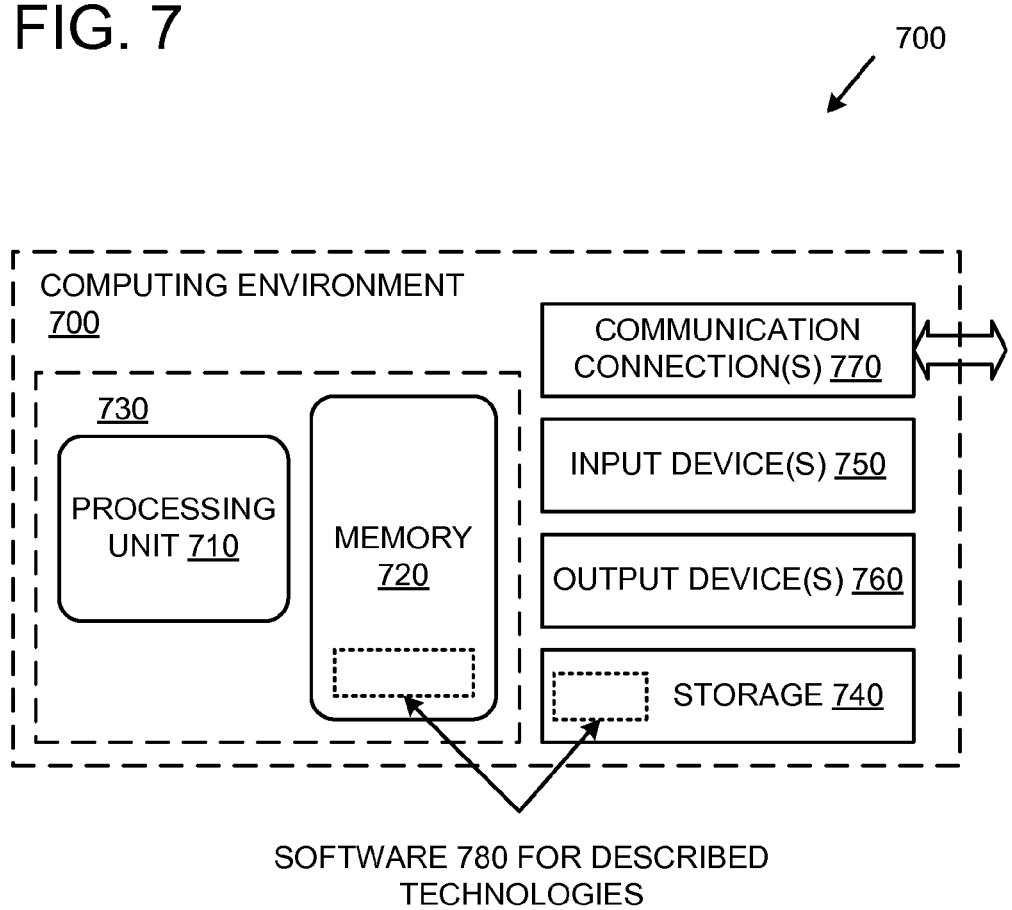
FIG. 7 is a block diagram illustrating an example of a computing environment that can be used to implement any of the technologies described herein.

FIG. 7 illustrates a generalized example of a suitable computing environment 700 in which described embodiments, techniques, and technologies may be implemented. The computing environment 700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions and may be a real or a virtual processor. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 700. By way of example, and not limitation, with the computing environment 700, computer-readable media include memory 720, storage 740, communication media (not shown), and combinations of any of the above.

The indexed file layout and client side rate control techniques and solutions described in this application can be used in various combinations to provide more efficient organization and streaming of multimedia content. For example, a program can be divided into streaming segments, each streaming segment independently encoded at one or more bitrates (e.g., for each of one or more audio and/or video tracks of the program). Index information describing the program and available bitrates for the streaming segments can be stored. A client can download the index information and use it for client side rate control (e.g., to determine an efficient or optimal sequence of bitrates to download for each streaming segment).

Any of the methods described herein can be performed via one or more computer-readable media (e.g., storage or other tangible media) comprising (e.g., having or storing) computer-executable instructions for performing (e.g., causing a computing device, audio and/or video processing device, or computer to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method for optimizing client-side rate control of streaming content, the method comprising:
receiving, by the client from a server, index information for a program of encoded audio and/or video content;
for each of a plurality of states representing bitrate encodings of streaming segments of the program, performing, entirely by a client, client-side rate control operations comprising:
selecting one or more available paths that end in the state, where the one or more available paths are those paths ending in the state that satisfy a constraint condition;
selecting a best path to the state from the one or more available paths, wherein the best path has the lowest distortion amongst the one or more available paths; and
eliminating, as available paths, all of the one or more available paths other than the best path; and
downloading, by the client from the server, one or more streaming segments encoded at bitrates corresponding to the best path to an ending state through the plurality of states, wherein each of the plurality of states corresponds to a specific bitrate encoding of a specific streaming segment;
wherein the index information is used by the client to identify the plurality of states, select the one or more available paths, and select the best path.

2. The method of claim 1 wherein the constraint condition is satisfied when a sum of time it takes to download all streaming segments up to a current position is less than or equal to initial startup delay plus cumulative playback time up to the current position.

3. The method of claim 1 wherein the constraint condition is defined by the following equation:

$$T_0 + \sum_{i=0}^{n-1} t[i] \geq \sum_{i=0}^{n} s[u[i], i],$$

where $T_0$ is the initial delay, "t[i]" is the playback duration of the i'th position, "u[i]" is the index of the chosen bitrate for the i'th position, "s[u[i],i]" is the download time for downloading the u[i] bitrate for the i'th position, and "n" is the current position.

4. The method of claim 1 further comprising:
displaying, by the client, the decoded streaming segments corresponding to the best path.

5. The method of claim 1 wherein the index information for the program comprises:
streaming segment index information describing each streaming segment of the program, wherein the streaming segment index information comprises, for each streaming segment:
a start position of the streaming segment; and
an indication of bitrates for each available streaming segment encoding of the streaming segment, wherein a plurality of different bitrates are available for at least one streaming segment.

6. A method for optimizing client-side rate control of streaming content, the method comprising:
receiving, by the client from a server, index information for a program of encoded audio and/or video content;
for each of a plurality of states representing bitrate encodings of streaming segments of the program, performing, entirely by a client, client-side rate control operations comprising:
selecting one or more available paths that end in the state, where the one or more available paths are those paths ending in the state that satisfy a constraint condition; and
retaining the one or more available paths as possible paths to be included in a best end-to-end path;
performing an end-to-end analysis of the possible paths to determine the best end-to-end path, wherein the best end-to-end path has the lowest overall distortion; and
downloading, by the client from the server, one or more streaming segments encoded at bitrates corresponding to the best end-to-end path through the plurality of states, wherein each of the plurality of states corresponds to a measure of client buffer fullness for a specific bitrate encoding of a specific streaming segment;
wherein the index information is used by the client to identify the plurality of states and select the one or more available paths.

7. The method of claim 6 wherein the constraint condition is satisfied when a sum of time it takes to download all streaming segments up to a current position is less than or equal to initial startup delay plus cumulative playback time up to the current position.

8. The method of claim 6 wherein the constraint condition is defined by the following equation:

$$T_0 + \sum_{i=0}^{n-1} t[i] \geq \sum_{i=0}^{n} s[u[i], i],$$

where $T_0$ is the initial delay, "t[i]" is the playback duration of the i'th position, "u[i]" is the index of the chosen bitrate for the i'th position, "s[u[i],i]" is the download time for downloading the u[i] bitrate for the i'th position, and "n" is the current position.

9. The method of claim 6 further comprising:

displaying, by the client, the decoded streaming segments corresponding to the best end-to-end path.

10. The method of claim 6 wherein the plurality of states are organized into a trellis.

11. A computing device comprising:

a processing unit;

a communication connection; and at least one of memory and storage media storing instructions for causing the computing device to perform operations for optimizing client-side rate control of streaming content, the operations comprising:

receiving, by the computing device via the communication connection, index information for a program of encoded audio and/or video content;

for each of a plurality of states representing bitrate encodings of streaming segments of the program, performing, entirely by the computing device, client-side rate control operations comprising:

selecting one or more available paths that end in the state, where the one or more available paths are those paths ending in the state that satisfy a constraint condition;

selecting a best path to the state from the one or more available paths, wherein the best path has the lowest distortion amongst the one or more available paths; and eliminating, as available paths, all of the one or more available paths other than the best path; and downloading, by the computing device via the communication connection, one or more streaming segments encoded at bitrates corresponding to the best path to an ending state through the plurality of states, wherein each of the plurality of states corresponds to a specific bitrate encoding of a specific streaming segment;

wherein the index information is used by the computing device to identify the plurality of states, select the one or more available paths, and select the best path.

12. The computing device of claim 11 wherein the constraint condition is satisfied when a sum of time it takes to download all streaming segments up to a current position is less than or equal to initial startup delay plus cumulative playback time up to the current position.

13. The computing device of claim 11 wherein the constraint condition is defined by the following equation:

$$T_0 + \sum_{i=0}^{n-1} t[i] \geq \sum_{i=0}^{n} s[u[i], i],$$

where $T_0$ is the initial delay, "t[i]" is the playback duration of the i'th position, "u[i]" is the index of the chosen bitrate for the i'th position, "s[u[i],i]" is the download time for downloading the u[i] bitrate for the i'th position, and "n" is the current position.

14. The computing device of claim 11, the operations further comprising:

displaying, by the computing device via a display of the computing device, the decoded streaming segments corresponding to the best path.

* * * * *